United States Patent
Bronson et al.

(10) Patent No.: US 9,917,479 B2
(45) Date of Patent: Mar. 13, 2018

(54) WIRELESS ENERGY TRANSFER FOR MOBILE DEVICE APPLICATIONS

(71) Applicant: WiTricity Corporation, Watertown, MA (US)

(72) Inventors: Daniel Bronson, Nibley, UT (US); Bryan T. Sharp, North Logan, UT (US); Kylee D. Sealy, Logan, UT (US)

(73) Assignee: WiTricity Corporation, Watertown, MA (US)

(*) Notice: Subject to any disclaimer, the term of this patent is extended or adjusted under 35 U.S.C. 154(b) by 313 days.

(21) Appl. No.: 14/688,286

(22) Filed: Apr. 16, 2015

(65) Prior Publication Data

US 2015/0303706 A1 Oct. 22, 2015

Related U.S. Application Data

(60) Provisional application No. 61/980,420, filed on Apr. 16, 2014, provisional application No. 61/981,983, filed on Apr. 21, 2014, provisional application No. 62/024,419, filed on Jul. 14, 2014, provisional application No. 62/059,035, filed on Oct. 2, 2014, provisional application No. 62/078,379, filed on Nov. 11, 2014, provisional application No. 62/079,817, filed on Nov. 14, 2014.

(51) Int. Cl.
| | |
|---|---|
| *H01F 27/42* | (2006.01) |
| *H02J 50/12* | (2016.01) |
| *H01F 38/14* | (2006.01) |
| *H01F 27/28* | (2006.01) |

(52) U.S. Cl.
CPC .......... *H02J 50/12* (2016.02); *H01F 27/2804* (2013.01); *H01F 38/14* (2013.01); *H01F 2027/2809* (2013.01)

(58) Field of Classification Search
CPC ....................................................... H02J 50/12
See application file for complete search history.

(56) References Cited

U.S. PATENT DOCUMENTS

| 3,967,161 A | 6/1976 | Litchblau |
|---|---|---|
| 6,313,623 B1 | 11/2001 | Kojovic et al. |
| D451,893 S | 12/2001 | Robson |

(Continued)

OTHER PUBLICATIONS

International Search Report issued in counterpart International Application No. PCT/US2015/026134 dated Aug. 28, 2015.

(Continued)

*Primary Examiner* — Daniel Puentes
(74) *Attorney, Agent, or Firm* — Fish & Richardson P.C.

(57) ABSTRACT

A current sensing system and method for wireless energy transfer may include a printed circuit board, wherein the printed circuit board may include at least a first layer, a second layer, and a third layer. A loop of conductive material may be included, wherein the loop of conductive material may include a diameter D3 on the second layer. A coil of conductive material may be included, wherein the coil of conductive material may have at least 2 turns, wherein a majority of the coil of conductive material may occupy the first layer and the third layer with an outer diameter D1 and an inner diameter D2, connected through each of the first, second, and third layers. The loop of conductive material may be coupled to the coil of conductive material.

21 Claims, 30 Drawing Sheets

(56) References Cited

U.S. PATENT DOCUMENTS

| | | |
|---|---|---|
| D452,220 S | 12/2001 | Robson |
| 6,414,475 B1 | 7/2002 | Dames et al. |
| D474,472 S | 5/2003 | Maekawa et al. |
| 7,126,450 B2 | 10/2006 | Baarman et al. |
| D532,756 S | 11/2006 | Lai |
| D532,757 S | 11/2006 | Lai |
| D541,322 S | 4/2007 | Garrett et al. |
| 7,212,414 B2 | 5/2007 | Baarman |
| D545,769 S | 7/2007 | Branzell |
| 7,525,283 B2 | 4/2009 | Cheng et al. |
| 7,880,547 B2 | 2/2011 | Lee et al. |
| D636,333 S | 4/2011 | Kulikowski |
| 8,035,255 B2 | 10/2011 | Kurs et al. |
| 8,058,950 B1 | 11/2011 | Senderowicz |
| 8,106,539 B2 | 1/2012 | Schatz et al. |
| 8,115,448 B2 | 2/2012 | John |
| 8,304,935 B2 | 11/2012 | Karalis et al. |
| 8,324,759 B2 | 12/2012 | Karalis et al. |
| 8,400,017 B2 | 3/2013 | Kurs et al. |
| 8,410,636 B2 | 4/2013 | Kurs et al. |
| 8,441,154 B2 | 5/2013 | Karalis et al. |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,158 B2 | 7/2013 | Kurs et al. |
| 8,487,480 B1 | 7/2013 | Kesler et al. |
| 8,497,601 B2 | 7/2013 | Hall et al. |
| D692,010 S | 10/2013 | Verghese |
| 8,552,592 B2 | 10/2013 | Schatz et al. |
| 8,569,914 B2 | 10/2013 | Karalis et al. |
| 8,587,153 B2 | 11/2013 | Schatz et al. |
| 8,587,155 B2 | 11/2013 | Giler et al. |
| 8,598,743 B2 | 12/2013 | Hall et al. |
| 8,618,696 B2 | 12/2013 | Kurs et al. |
| D697,477 S | 1/2014 | Jonas, III |
| 8,629,578 B2 | 1/2014 | Kurs et al. |
| 8,643,326 B2 | 2/2014 | Campanella et al. |
| D701,182 S | 3/2014 | Plant |
| 8,667,452 B2 | 3/2014 | Verghese et al. |
| 8,669,676 B2 | 3/2014 | Karalis et al. |
| 8,686,598 B2 | 4/2014 | Schatz et al. |
| 8,692,410 B2 | 4/2014 | Schatz et al. |
| 8,692,412 B2 | 4/2014 | Fiorello et al. |
| D705,745 S | 5/2014 | Kurs et al. |
| 8,716,903 B2 | 5/2014 | Kurs et al. |
| 8,723,366 B2 | 5/2014 | Fiorello et al. |
| 8,729,737 B2 | 5/2014 | Schatz et al. |
| D709,855 S | 7/2014 | Jonas |
| 8,772,973 B2 | 7/2014 | Kurs |
| 8,805,530 B2 | 8/2014 | John |
| 8,847,548 B2 | 9/2014 | Kesler et al. |
| 8,875,086 B2 | 10/2014 | Verghese et al. |
| 8,901,778 B2 | 12/2014 | Kesler et al. |
| 8,901,779 B2 | 12/2014 | Kesler et al. |
| 8,907,531 B2 | 12/2014 | Hall et al. |
| 8,912,687 B2 | 12/2014 | Kesler et al. |
| 8,922,066 B2 | 12/2014 | Kesler et al. |
| 8,928,276 B2 | 1/2015 | Kesler et al. |
| 8,933,594 B2 | 1/2015 | Kurs et al. |
| 8,937,408 B2 | 1/2015 | Ganem et al. |
| D722,048 S | 2/2015 | Kurs et al. |
| 8,946,938 B2 | 2/2015 | Kesler et al. |
| 8,947,186 B2 | 2/2015 | Kurs et al. |
| 8,957,549 B2 | 2/2015 | Kesler et al. |
| 8,963,488 B2 | 2/2015 | Campanella et al. |
| 9,035,499 B2 | 5/2015 | Kesler et al. |
| D734,731 S | 7/2015 | Kurs |
| 2002/0089405 A1 | 6/2002 | Jitaru |
| 2003/0036000 A1 | 2/2003 | Mori et al. |
| 2004/0178875 A1* | 9/2004 | Saito .................. G01R 15/181 336/200 |
| 2004/0261544 A1 | 12/2004 | Peshkin |
| 2005/0116683 A1 | 6/2005 | Cheng et al. |
| 2008/0253149 A1 | 10/2008 | Matumoto |
| 2009/0072629 A1 | 3/2009 | Cook et al. |
| 2009/0085706 A1 | 4/2009 | Baarman et al. |
| 2010/0181842 A1 | 7/2010 | Suzuki et al. |
| 2010/0219694 A1 | 9/2010 | Kurs et al. |
| 2010/0245012 A1 | 9/2010 | Chang |
| 2010/0256481 A1 | 10/2010 | Mareci et al. |
| 2010/0259110 A1 | 10/2010 | Kurs et al. |
| 2010/0277121 A1 | 11/2010 | Hall et al. |
| 2011/0043049 A1 | 2/2011 | Karalis et al. |
| 2011/0050164 A1 | 3/2011 | Partovi et al. |
| 2011/0074346 A1 | 3/2011 | Hall et al. |
| 2011/0095618 A1 | 4/2011 | Schatz et al. |
| 2011/0101788 A1 | 5/2011 | Sun et al. |
| 2011/0266878 A9 | 11/2011 | Cook et al. |
| 2012/0007441 A1 | 1/2012 | John |
| 2012/0032522 A1 | 2/2012 | Schatz et al. |
| 2012/0062345 A1 | 3/2012 | Kurs et al. |
| 2012/0086284 A1 | 4/2012 | Campanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119698 A1 | 5/2012 | Karalis et al. |
| 2012/0146576 A1 | 6/2012 | Partovi |
| 2012/0206096 A1 | 8/2012 | John |
| 2012/0218068 A1 | 8/2012 | Yamakawa et al. |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235566 A1 | 9/2012 | Karalis et al. |
| 2012/0242159 A1 | 9/2012 | Lou et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0313449 A1 | 12/2012 | Kurs et al. |
| 2012/0313742 A1 | 12/2012 | Kurs et al. |
| 2013/0002041 A1 | 1/2013 | Hatanaka et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0068507 A1* | 3/2013 | Singh ...................... H05K 1/16 174/251 |
| 2013/0069441 A1 | 3/2013 | Verghese et al. |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0175874 A1 | 7/2013 | Lou et al. |
| 2013/0200721 A1 | 8/2013 | Kurs et al. |
| 2013/0221744 A1 | 8/2013 | Hall et al. |
| 2013/0249303 A1 | 9/2013 | Keeling et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0307349 A1 | 11/2013 | Hall et al. |
| 2013/0334892 A1 | 12/2013 | Hall et al. |
| 2014/0002012 A1 | 1/2014 | McCauley et al. |

(56) References Cited

U.S. PATENT DOCUMENTS

| | | |
|---|---|---|
| 2014/0021798 A1 | 1/2014 | Kesler et al. |
| 2014/0035378 A1 | 2/2014 | Kesler et al. |
| 2014/0035704 A1 | 2/2014 | Efe et al. |
| 2014/0044281 A1 | 2/2014 | Ganem et al. |
| 2014/0044293 A1 | 2/2014 | Ganem et al. |
| 2014/0049118 A1 | 2/2014 | Karalis et al. |
| 2014/0084703 A1 | 3/2014 | Hall et al. |
| 2014/0084859 A1 | 3/2014 | Hall et al. |
| 2014/0091636 A1 | 4/2014 | Ofstein et al. |
| 2014/0091756 A1 | 4/2014 | Ofstein et al. |
| 2014/0103738 A1 | 4/2014 | Campanella et al. |
| 2014/0111019 A1 | 4/2014 | Roy et al. |
| 2014/0111154 A1 | 4/2014 | Roy et al. |
| 2014/0139037 A1 | 5/2014 | John et al. |
| 2014/0142876 A1 | 5/2014 | John et al. |
| 2014/0159652 A1 | 6/2014 | Hall et al. |
| 2014/0175892 A1 | 6/2014 | Jonas et al. |
| 2014/0175898 A1 | 6/2014 | Kurs et al. |
| 2014/0225449 A1 | 8/2014 | Kurs et al. |
| 2014/0265555 A1 | 9/2014 | Hall et al. |
| 2014/0265617 A1 | 9/2014 | Roy et al. |
| 2014/0312707 A1 | 10/2014 | Fiorello et al. |
| 2014/0327320 A1 | 11/2014 | Muhs et al. |
| 2014/0339910 A1 | 11/2014 | Sealy |
| 2014/0361627 A1 | 12/2014 | Kurs et al. |
| 2015/0008761 A1 | 1/2015 | Kesler et al. |
| 2015/0051750 A1 | 2/2015 | Kurs et al. |
| 2015/0057496 A1 | 2/2015 | Schatz et al. |
| 2015/0061404 A1 | 3/2015 | Lamenza et al. |
| 2015/0069831 A1 | 3/2015 | Kesler et al. |
| 2015/0073768 A1 | 3/2015 | Kurs et al. |
| 2015/0080981 A1 | 3/2015 | John |
| 2015/0088129 A1 | 3/2015 | Ganem et al. |
| 2015/0115733 A1 | 4/2015 | Sealy et al. |
| 2015/0123484 A1 | 5/2015 | Kurs et al. |
| 2015/0170830 A1 | 6/2015 | Miyamoto |

OTHER PUBLICATIONS

Kurs, et al, "Wireless Power Transfer via Strongly Coupled Magnetic Resonances", Science, vol. 317, Jul. 6, 2007, pp. 83-85.

Putnam, et al., "Sea Anemone Genome Reveals Ancestral Eumetazoan Gene Repertoire and Genomic Organization", Science, vol. 317, Jul. 6, 2007, 1 pages.

Karalis, et al, "Efficient Wireless Non-Radiative Mid-Range Energy Transfer", Elsevier Inc., Apr. 17, 2007.

Stark, III, Joseph C., "Wireless Power Transmission Utilizing a Phased Array of Tesla Coils", May 2004, Massachusetts Institute of Technology.

L. Rong et al., "Investigation of the Influence of Electrical Parameters on Dynamic Property of Self-Integrating Rogowski Coil", Przeglad Elektrotechniczny (Electrotechnical Review), vol. 2013 No. 4, pp. 115-119., Apr. 25, 2013, Warsawa, Poland.

* cited by examiner

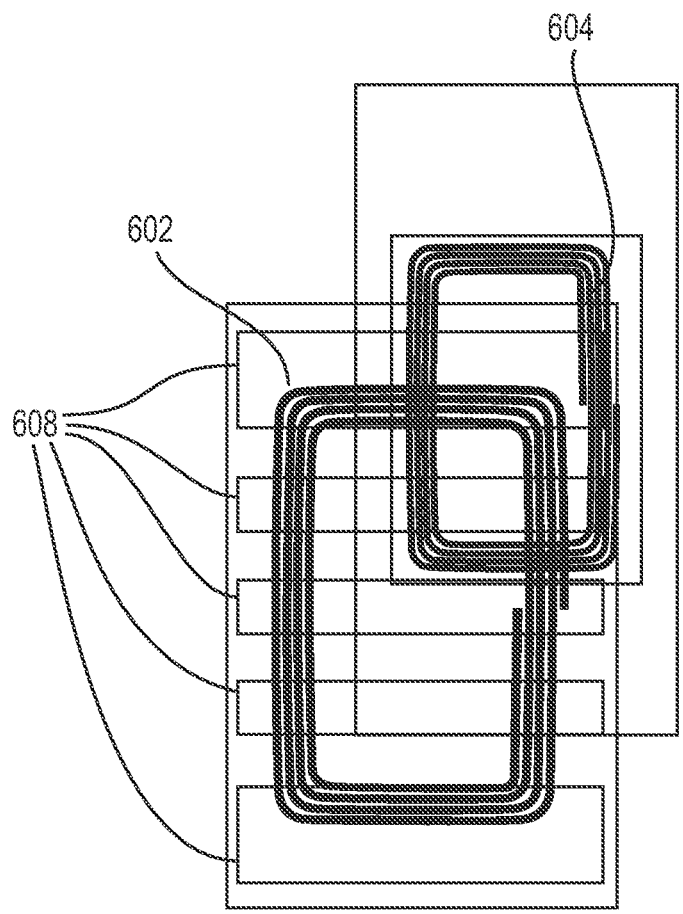
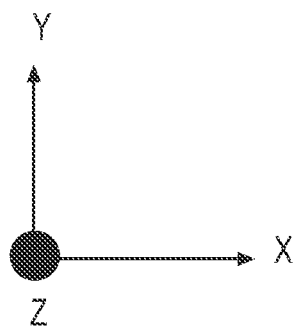
FIG. 7

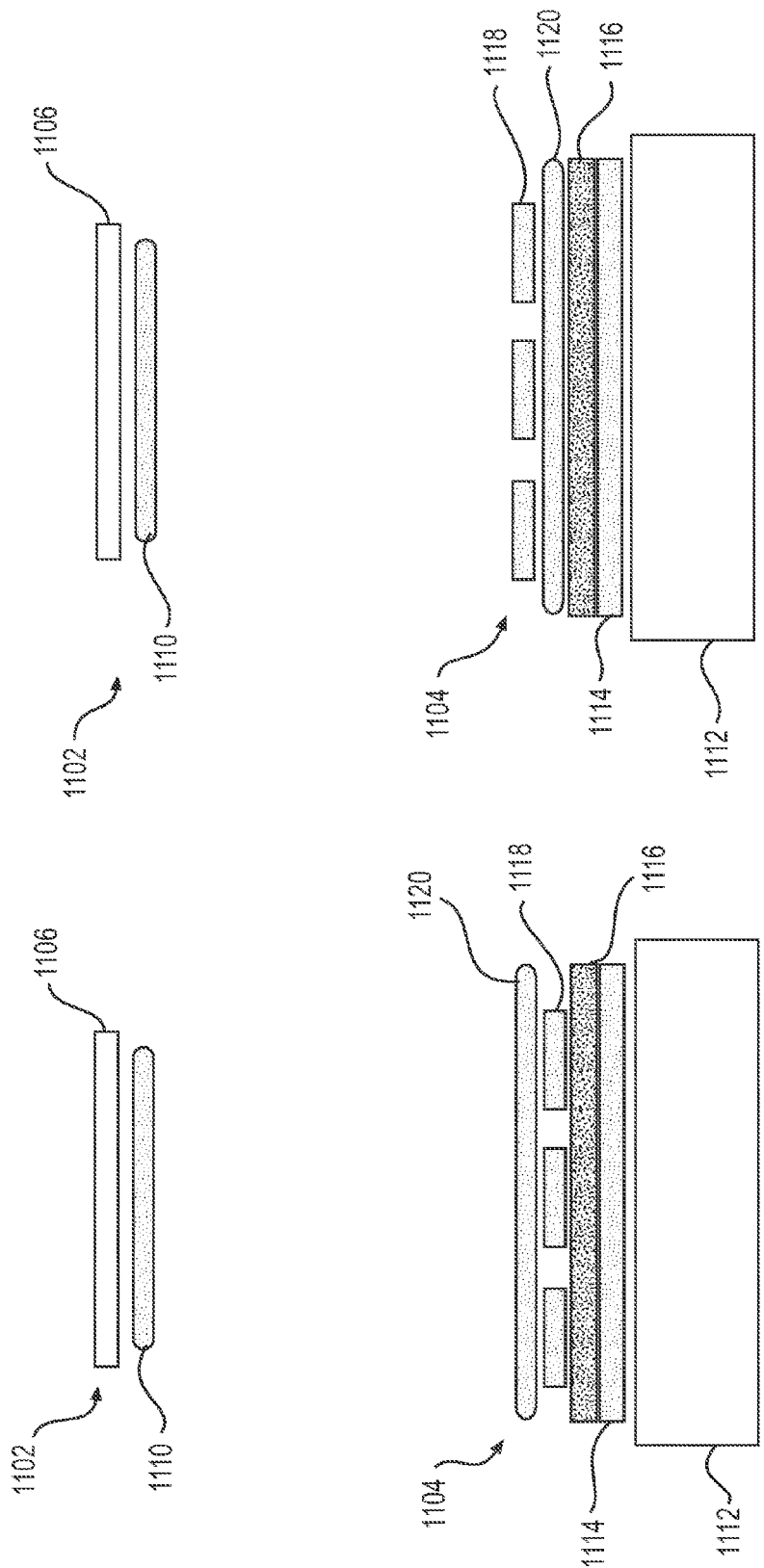

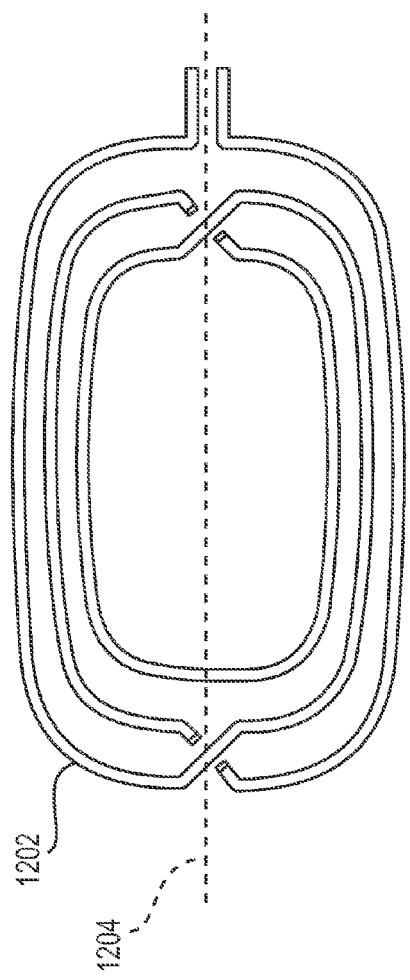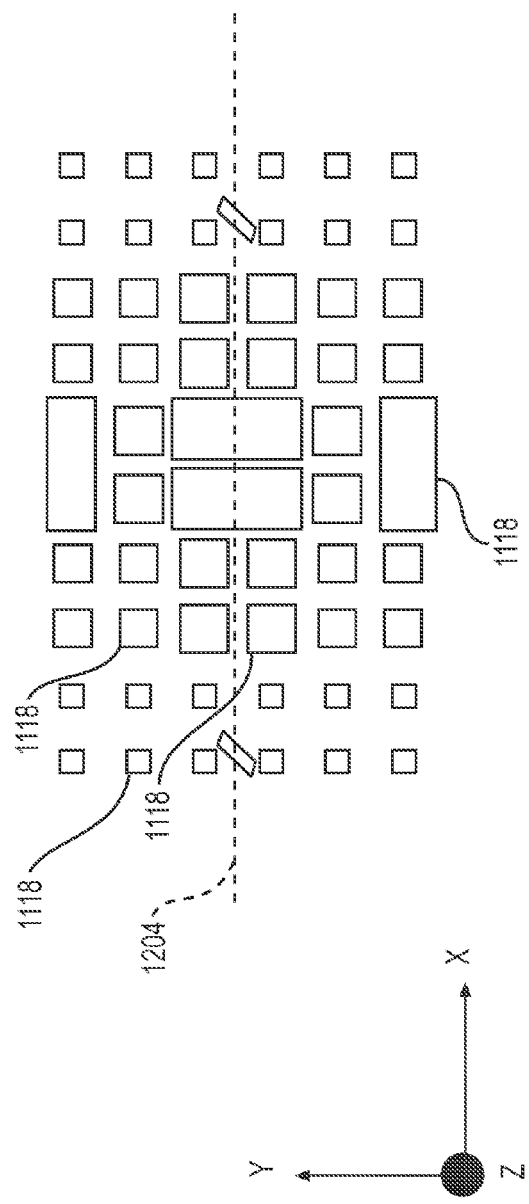

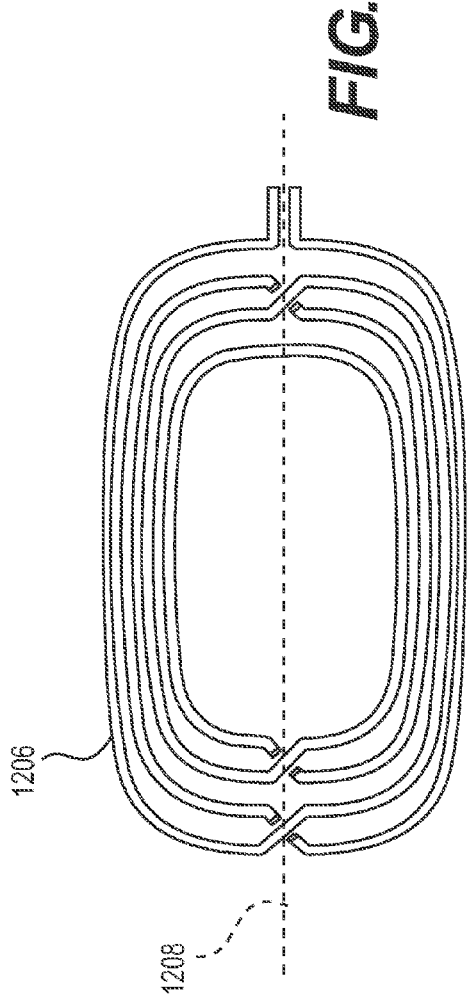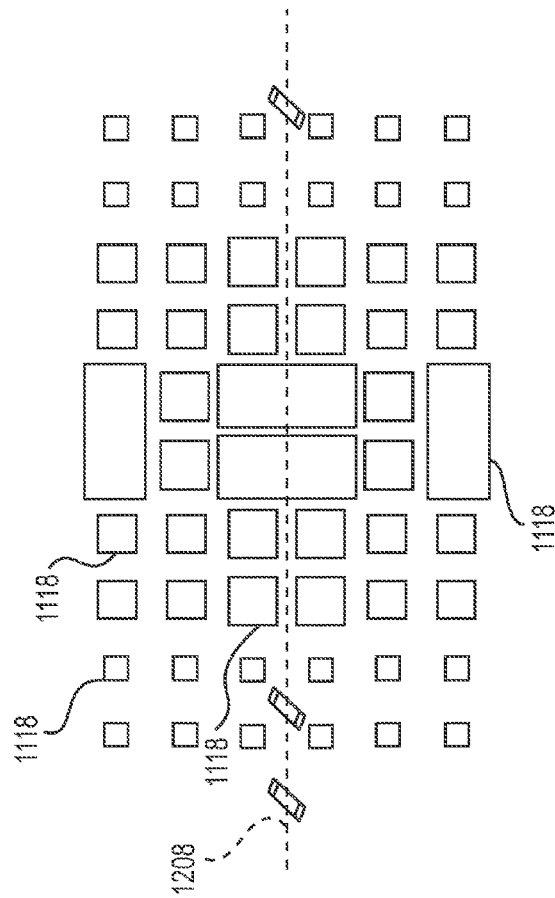

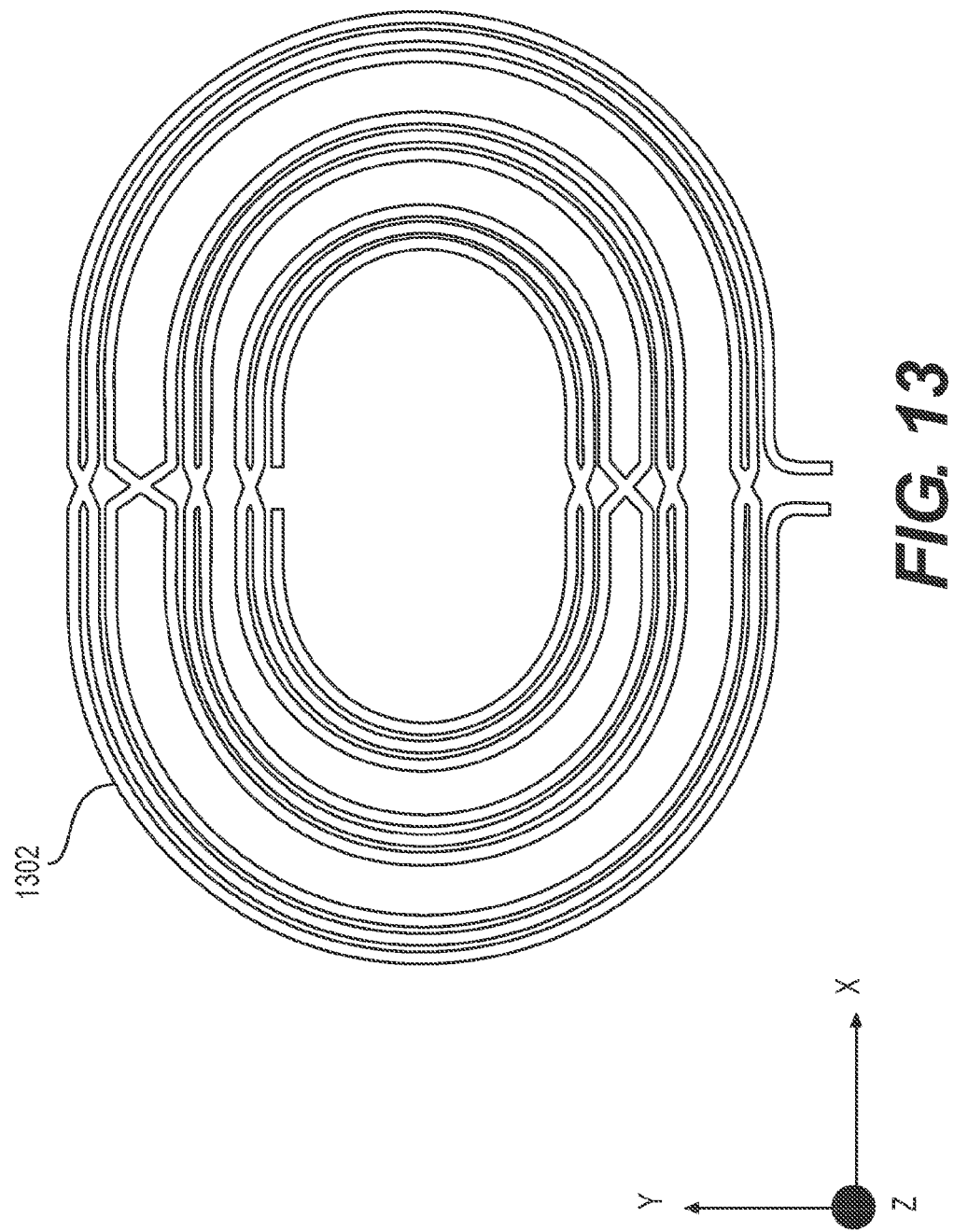

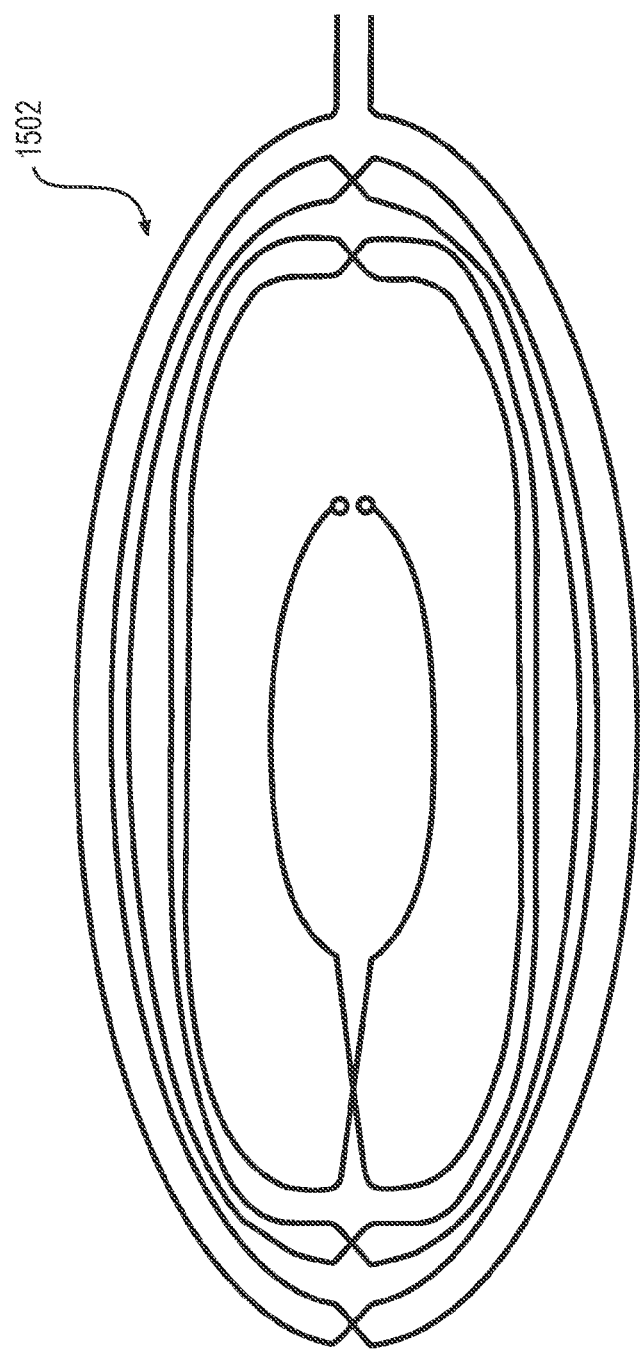
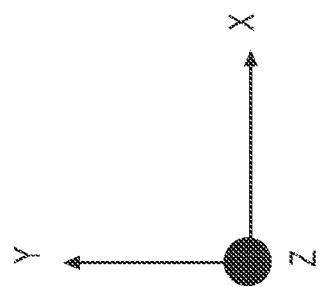
FIG. 15

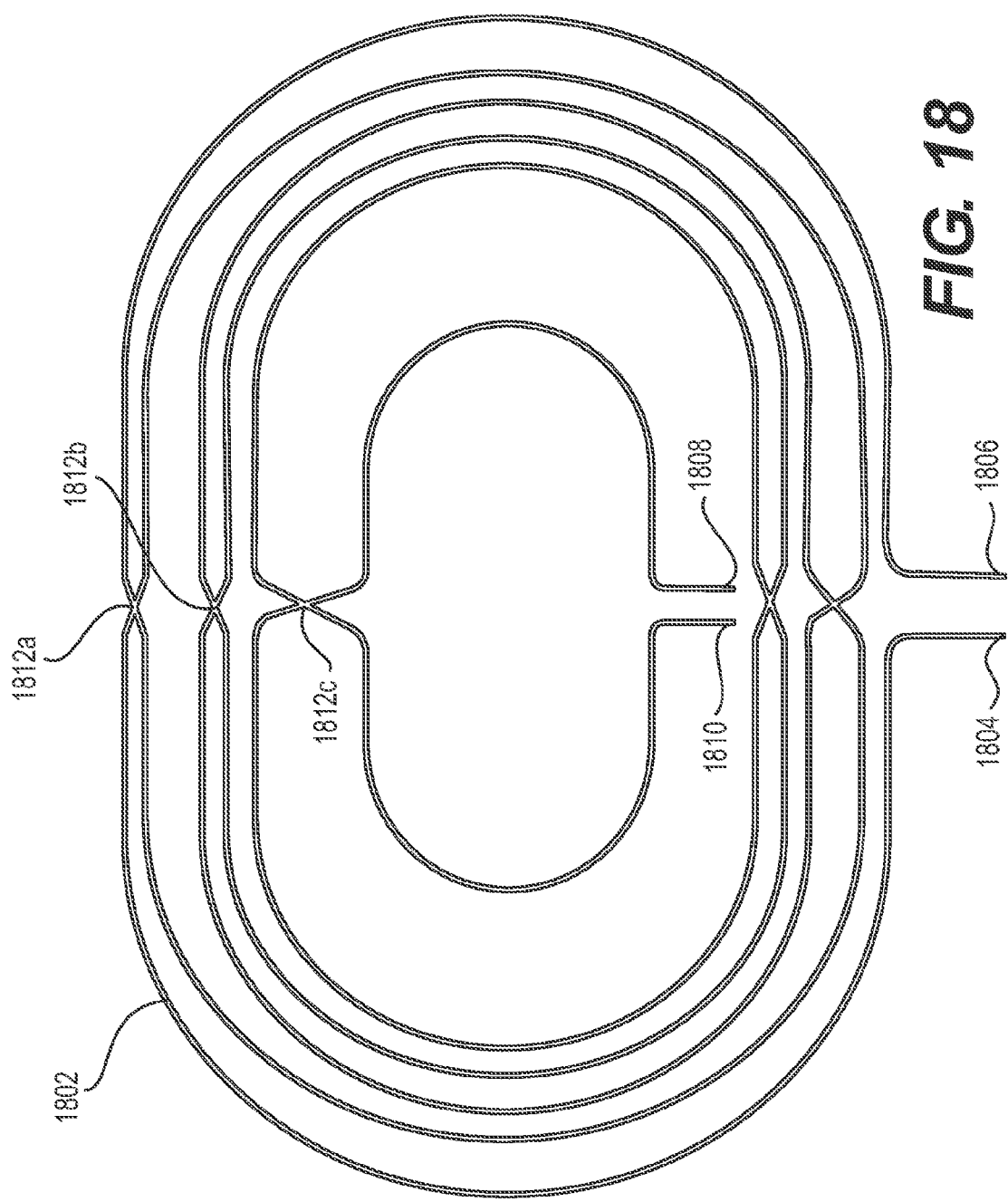

WIRELESS ENERGY TRANSFER FOR MOBILE DEVICE APPLICATIONS

RELATED CASES

This application claims the benefit of U.S. Provisional Application No. 61/980,420 filed on 16 Apr. 2014, U.S. Provisional Application No. 61/981,983 filed on 21 Apr. 2014, U.S. Provisional Application No. 62/024,419 filed on 14 Jul. 2014, U.S. Provisional Application No. 62/059,035 filed on 2 Oct. 2014, U.S. Provisional Application No. 62/078,379 filed on 11 Nov. 2014, and U.S. Provisional Application No. 62/079,817 filed on 14 Nov. 2014, the contents of which are all incorporated by reference.

BACKGROUND

Energy or power may be transferred wirelessly using a variety of known techniques for, e.g., the purpose of doing work, such as for powering or charging electrical devices. For example, wireless power transfer systems (e.g., highly resonant wireless power transfer systems) may include high quality factor resonators that may be driven to generate oscillating electromagnetic fields and that may interact with oscillating magnetic fields to generate currents and/or voltages in electronic circuits. That is, energy may be transferred wirelessly using oscillating magnetic fields. For instance, wireless energy exchange between a source resonator (e.g., coupled to a power supply such as AC mains, battery, solar panels, etc.) and a remote resonator (e.g., integrated with electronic mobile devices, enclosures, sleeves, cases, covers, chargers, etc.) may exchange wireless energy, which as noted above, may be used to power or charge the associated electronic mobile device.

The wireless energy exchange between the source resonator and the remote (device) resonator may be optimized when the resonators are tuned to substantially the same frequency and when the losses in the system are minimal. As a non-limiting example, remote devices, such as a smart phone or other mobile electronic device, may be powered directly, using the wirelessly supplied power or energy, or the devices may be coupled to an energy storage unit such as a battery, a super-capacitor, an ultra-capacitor, or the like (or other kind of power drain), where the energy storage unit may be charged or re-charged wirelessly, and/or where the wireless power transfer mechanism may be supplementary to the main power source of the device. However, while known resonator designs may be optimized while at a distance, these resonators may be less optimal, e.g., in closer proximity. For instance, as a non-limiting example, the source resonator may detune the device resonator as each resonator moves closer in proximity to one another. Additionally, known current sensing techniques that may be used for wireless energy transfer may, e.g., have excessive loss and power dissipation for the high current and high frequencies used in some types of wireless energy transfer, may have frequency restrictions used in wireless energy transfer, may be susceptible to magnetic interference, may be expensive, and may add to the size of the overall devices.

BRIEF SUMMARY OF DISCLOSURE

In one example implementation, a wireless energy transfer system may include but is not limited to a first layer of conductive material that may be positioned proximate to a second layer. The second layer of magnetic material may be positioned proximate to the first layer of conductive material and a third layer. The third layer may be positioned proximate to the second layer and a fourth layer, wherein the third layer may include a first resonator coil, wherein the first resonator coil may be configured to transfer wireless energy to a second resonator coil when the second resonator coil is proximate to the first resonator coil. The fourth layer may be positioned proximate to the third layer, wherein the fourth layer may include a plurality of conductive material.

One or more of the following example features may be included. At least one of a size, a shape, and a geometric position of the plurality of pieces of conductive material may reduce inductance shifting in the second resonator coil when the first resonator coil is proximate to the second resonator coil. The shape may be a rectangle. The shape may be a square. At least a first portion of the plurality of pieces of the conductive material may be a first shape, and wherein at least a second portion of the plurality of pieces of the conductive material may be a second shape. At least a portion of the plurality of pieces of the conductive material may be arranged in a checkered pattern relative to the first resonator coil. The first resonator coil may include copper trace. For example, at least a portion of the trace may include copper. The magnetic material may include ferrite. For example, at least a portion of the magnetic material may include ferrite. The plurality of pieces of conductive material of the fourth layer may include copper. The first layer of conductive material may include copper. The first, layer may be coupled to a surface of a mobile battery unit. The magnetic material may have a thickness less than 1 mm. The magnetic material may have a thickness less than 0.5 mm. The first resonator coil may be configured to transfer at least 5 W of energy to the second resonator coil. The first resonator coil may be configured to transfer at least 10 W of energy to the second resonator coil.

In another example implementation, a wireless energy transfer system may include but is not limited to a first layer of conductive material that may be positioned proximate to a second layer. The second layer of magnetic material may be positioned proximate to the first layer of conductive material and a third layer. The third layer may be positioned proximate to the second layer and a fourth layer, wherein the third layer may include a plurality of pieces of conductive material. The fourth layer may be positioned proximate to the third layer, wherein the fourth layer may include a first resonator coil, wherein the first resonator coil may be configured to transfer wireless energy to a second resonator coil when the second resonator coil is proximate to the first resonator coil.

One or more of the following example features may be included. At least one of a size, a shape, and a geometric position of the plurality of pieces of conductive material may reduce inductance shifting in the second resonator coil when the first resonator coil is proximate to the second resonator coil. The shape may be a rectangle. The shape may be a square. At least a first portion of the plurality of pieces of the conductive material may be a first shape, and wherein at least a second portion of the plurality of pieces of the conductive material may be a second shape. At least a portion of the plurality of pieces of the conductive material may be arranged in a checkered pattern relative to the first resonator coil. The first resonator coil may include copper trace. The magnetic material may include ferrite. The plurality of pieces of conductive material of the third layer may include copper. The first layer of conductive material may include copper. The first layer may be coupled to a surface of a mobile battery unit. The magnetic material may have a thickness less than 1 mm. The magnetic material may have a thickness less than 0.5 mm. The first resonator coil may be configured to transfer at least 5 W of energy to the second resonator coil. The first resonator coil may be configured to transfer at least 10 W of energy to the second resonator coil.

In another example implementation, a resonator for a wireless energy transfer system may include but is not limited to a first resonator coil, wherein the first resonator coil may be configured to transfer wireless energy to a second resonator coil when the first resonator coil is proximate to the second resonator coil. A first winding of trace may be included in the first resonator coil, wherein the first winding of trace may include conductive material. A second winding of trace may be included in the first resonator coil, wherein the second winding of trace may include conductive material. A portion of the trace of the first winding may cross over a portion of the trace of the second winding at a crossover point.

One or more of the following example features may be included. The portion of the trace for the first winding may cross over the portion of the trace for the second winding at the crossover point without physical contact between the portion of the trace for the first winding and the portion of the trace for the second winding. The first resonator coil may be printed on a printed circuit board, wherein the portion of the trace for the first winding may stop on a first side of the printed circuit board at the crossover point and may continue on a second side of the printed circuit board, wherein the portion of the trace for the second winding on the second side of the printed circuit board may stop on the second side and may continue on the first side after the crossover point. The portion of the trace for the first winding may stop on the first side of the portion of the trace for the second winding on a first layer of a printed circuit board before reaching the crossover point, and may continue on the second side of the portion of the trace for the second winding on a second layer of the printed circuit board after reaching the crossover point. A second portion of the trace for the first winding may cross over a second portion of the trace for the second winding at a symmetrical crossover point. The crossover point may occur in a middle portion of the first resonator coil. The crossover point may occur in an end portion of the first resonator coil. The trace of at least one of the first winding and second winding may include copper coil. A first layer of conductive material may be included and positioned proximate to a second layer. The second layer of magnetic material may be included and positioned proximate to the first layer of conductive material and a third layer. The third layer may be included and positioned proximate to the second layer and a fourth layer, wherein the third layer may include a first resonator coil. The fourth layer may be included and positioned proximate to the third layer, wherein the fourth layer may include a plurality of pieces of conductive material.

In another example implementation, a wireless energy transfer system may include but is not limited to a first layer of conductive material that may be positioned proximate to a second layer. The second layer of magnetic material may be included and positioned proximate to the first layer of conductive material and a third layer. The third layer may be positioned proximate to the second layer and a fourth layer, wherein the third layer may include a first resonator coil, wherein the first resonator coil may be configured to transfer wireless energy to a second resonator coil when the first resonator coil is proximate to the second resonator coil. A first winding of trace may be included in the first resonator coil, wherein the first winding of trace may include conductive material. A second winding of trace may be included in the first resonator coil, wherein the second winding of trace may include conductive material. A portion of the trace for the first winding may cross over a portion of the trace for the second winding at a crossover point. The fourth layer may include a plurality of pieces of conductive material.

One or more of the following example features may be included. The portion of the trace for the first winding may cross over the portion of the trace for the second winding at the crossover point without physical contact between the portion of the trace for the first winding and the portion of the trace for the second winding. The first resonator coil may be printed on a printed circuit board, wherein the portion of the trace for the first winding may stop on a first side of the printed circuit board at the crossover point and may continue on a second side of the printed circuit board, wherein the portion of the trace for the second winding on the second side of the printed circuit board may stop on the second side and may continue on the first side after the crossover point. The portion of the trace for the first winding may stop on the first side of the portion of the trace for the second winding on a first layer of a printed circuit board before reaching the crossover point, and may continue on the second side of the portion of the trace for the second winding on a second layer of the printed circuit board after reaching the crossover point. A second portion of the trace for the first winding may cross over a second portion of the trace for the second winding at a symmetrical crossover point. The crossover point may occur in a middle portion of the first resonator coil. The crossover point may occur in an end portion of the first resonator coil. The trace of at least one of the first winding and second winding may include copper coil. At least one of a size, a shape, and a geometric position of the plurality of pieces of conductive material may reduce inductance shifting in the second resonator when the first resonator coil is proximate to the second resonator coil.

In another example implementation, a current sensing system for wireless energy transfer may include but is not limited to a printed circuit board, wherein the printed circuit board may include at least a first layer, a second layer, and a third layer. A loop of conductive material may be included, wherein the loop of conductive material may include a diameter D3 on the second layer. A coil of conductive material may be included, wherein the coil of conductive material may have at least 2 turns, wherein the coil of conductive material may occupy the first layer and the third layer with an outer diameter D1 and an inner diameter D2, connected through each of the first, second, and third layers. The loop of conductive material may be coupled to the coil of conductive material.

One or more of the following example features may be included. A current value of a conductor may be measured by routing the conductor through the inner diameter D2 of the coil of conductive material. The conductor may be part of a resonator coil. A parallel resonant circuit may be included and may remove harmonic content. A differential amplifier with a voltage output may be included. Peak detector circuitry may be included and may include an operational amplifier to track a peak of the voltage output and determine a measured current value of a conductor. A fourth layer proximate to the second and third layers may be included, wherein the fourth layer may include an additional loop of conductive material coupled to at least one of the loop of conductive material and the coil of conductive material, wherein the additional circular loop of conductive material may have a diameter D3 on the fourth layer. The coil of conductive material may include copper trace. The coil of conductive material may be configured with at least one of a straight return and a balanced winding. Currents with frequencies within a range of 85 kHz to 20 MHz may be configured to be measured. The coil of conductive material may have at least 15 turns.

In another example implementation, a method, performed by a current sensing system, may include but is not limited to driving a conductor with alternating current. An amplitude value and phase value of the alternating current may be measured using the current sensing system.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

FIG. 7 is an example diagrammatic view of a wireless energy transfer system according to one or more example implementations of the disclosure;

FIGS. 11A-11B are example diagrammatic views of wireless energy transfer systems according to one or more example implementations of the disclosure;

FIGS. 12A-12H are example diagrammatic views of layers of a wireless energy source according to one or more example implementations of the disclosure;

FIG. 13 is an example diagrammatic view of a source resonator coil according to one or more example implementations of the disclosure;

FIG. 15 is an example diagrammatic view of a source resonator coil according to one or more example implementations of the disclosure;

FIG. 18 is an example diagrammatic view of a source resonator coil according to one or more example implementations of the disclosure;

Like reference symbols in the various drawings indicate like elements.

DETAILED DESCRIPTION

Various aspects of wireless power transfer systems are disclosed, for example, in commonly owned U.S. Patent Application Publication No. 2010/0141042 A1, U.S. Patent Application Publication No. 2014/0049118 A1, U.S. Patent Application Publication No. 2012/0119569 A1, and U.S. Patent Application Publication 2013/0069753 A1, the entire contents of which are incorporated by reference herein.

As noted above, energy or power may be transferred wirelessly using a variety of known techniques for, e.g., the purpose of doing work, such as for powering or charging electrical devices. For example, wireless power transfer systems (e.g., highly resonant wireless power transfer systems) may include high quality factor resonators that may be driven to generate oscillating electromagnetic fields and that may interact with oscillating magnetic fields to generate currents and/or voltages in electronic circuits. That is, energy may be transferred wirelessly using oscillating magnetic fields. For instance, wireless energy exchange between a source resonator (e.g., coupled to a power supply such as AC mains, battery, solar panels, etc.) and a remote (device) resonator (e.g., integrated with mobile devices, enclosures, sleeves, cases, covers, chargers, etc.) may exchange wireless energy, which as noted above, may be used to power or charge the associated mobile device. Resonators, such as electromagnetic resonators, may include an inductive element (e.g., a loop of conductive material such as copper), a distributed inductance, or a combination of inductances, with inductance, L, and a capacitive element, a distributed capacitance, or a combination of capacitances, with capacitance, C. Provided with initial energy, such as electric field energy stored in the capacitor, the system may oscillate as the capacitor discharges transferring energy into magnetic field energy stored in the inductor which in turn may transfer energy back into electric field energy stored in the capacitor 104. The terms "loop" or "coil" may be used to indicate generally a conducting structure (e.g., wire, tube, strip/trace, etc.), that may enclose or encompass a surface of any shape and dimension, with any number of turns. More in-depth descriptions and examples of resonators for wireless energy transfer may be found in one or more of the above-noted commonly owned patent applications.

Figure 1:
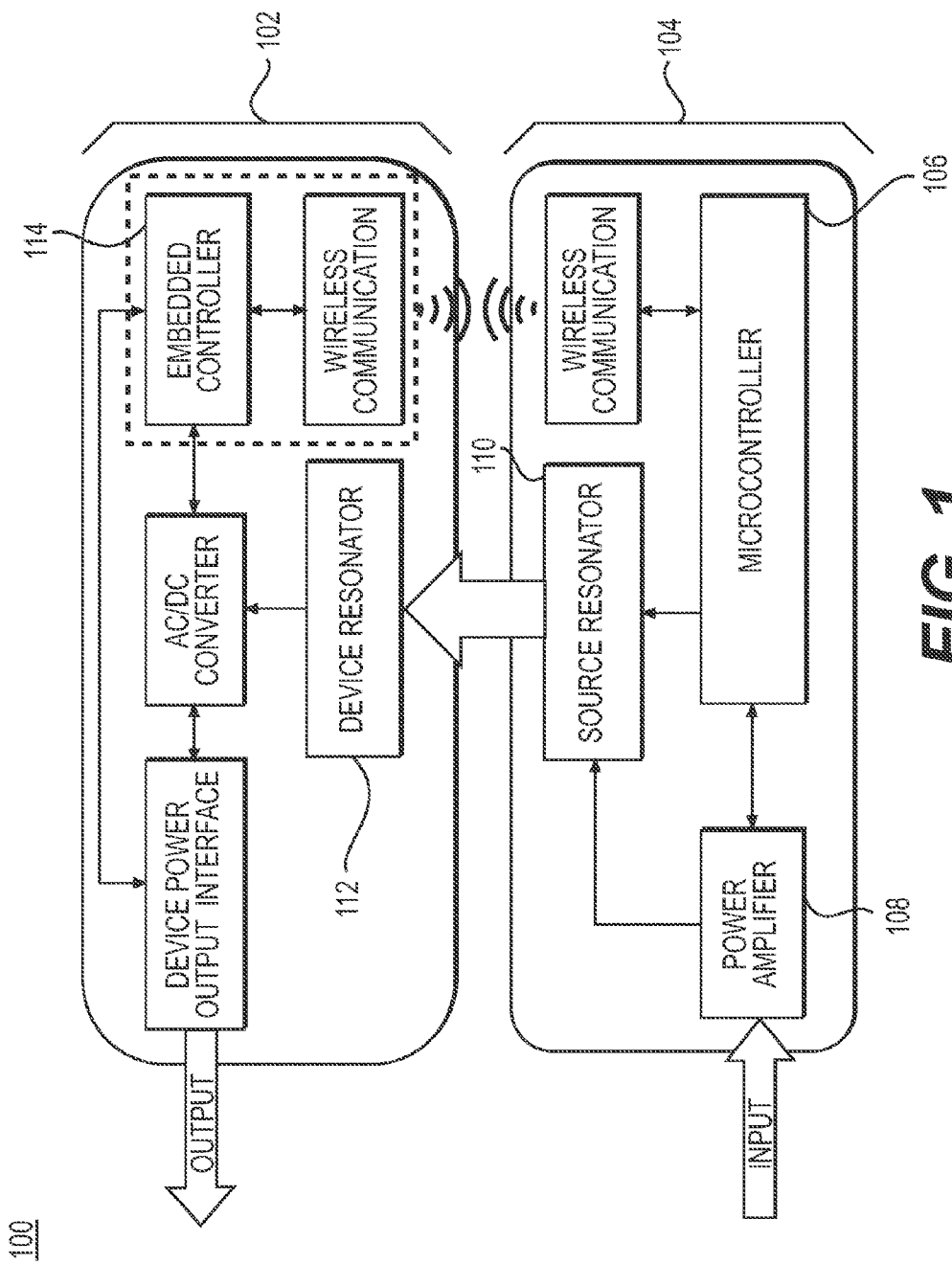
FIG. 1 is an example diagrammatic view of a wireless energy transfer system according to one or more example implementations of the disclosure.

Referring at least to FIG. 1, an example representation of a wireless energy transfer system 100 is shown. In some implementations, wireless energy transfer system 100 may be for mobile device applications, and may include, e.g., one or more sources (e.g., source 104) and one or more devices (e.g., device 102). In some implementations, a power supply coupled to a source may be a direct current (DC) (e.g., battery or other DC power source) or an alternating current (AC) (e.g., wall source or other AC power source). In some implementations, a microcontroller (e.g., microcontroller 106) may drive a power amplifier (e.g., power amplifier 108) at an operating frequency. In some implementations, microcontroller 106 may be used to drive power amplifier 108 as a means of in-band communication. The resonant frequency of a source resonator (e.g., source resonator 110) may be the same as the operating frequency. In some implementations, the operating frequency may include so-called "high frequencies", which may be equal to or greater than 85 KHz, greater than 200 KHz, or greater than 1 MHz. In some implementations, the operating frequency may include high frequencies, such as 6.78 MHz or 13.56 MHz. It will be appreciated that various other frequencies, including lesser frequencies than noted above, may be used without departing from the scope of the disclosure. In some implementations, power amplifier 108 may be, e.g., a class D or E amplifier. However, it will be appreciated that other classes of amplifiers may be used without departing from the scope of the disclosure. Source 104 may have a means of out-of-band wireless communication with device 102, such as Bluetooth or WiFi.

In some implementations, the wireless energy device (e.g., device 102) may include a device resonator (e.g., device resonator 112) designed to capture oscillating magnetic fields generated by the wireless energy source (e.g., source 104 via source resonator 110). Device 102 may also have a means of out-of-band wireless communication with source 104. Device 102 may include a controller (e.g., embedded controller 114) to manage power. The output of device 102 may be a load, such as a battery, appliance, mobile electronic device, etc. It will be appreciated that various other aspects of device 102 and source 104, such as impedance matching networks, etc. may be included without departing from the scope of the disclosure. More in-depth descriptions and examples of sources, devices, and their associated interactions/uses for wireless energy transfer may be found in one or more of the above-noted commonly owned patent applications. As such, the examples and descriptions of any particular implementations (e.g., configurations, components, electronic devices) of the disclosure should be taken as examples only and not to otherwise limit the scope of the disclosure.

In some implementations, one or more device resonators and their associated electronics may be integrated into an enclosure of a mobile device. For example, as will be discussed in greater detail below, the resonator and electronics may designed such that the profile is thin enough, e.g., to fit into the back of a mobile phone enclosure. As another example, the resonator and electronics may designed such that the profile is thin enough, e.g., to be integrated into a sleeve or attachment for the mobile device, as well as a charging pad on which to rest the mobile device. The sleeve or attachment may be fitted onto the mobile device via a port of the mobile device. The energy captured by the device resonator(s) and electronics may be used to charge the battery of the mobile device directly (e.g., by a wired connection or via a charging port of the mobile device). In some implementations, the sleeve or attachment for the mobile device may include one or more shields made of, e.g., copper, magnetic material, aluminum, and the like. In some implementations, a shield may be used to reduce magnetic field losses in the environment of the sleeve, reduce magnetic field losses in the mobile device, and/or used as a guide for the magnetic field. The sleeve may, in some implementations, be designed such that it does not block ports, speakers, lights, cameras, and the like of the mobile device. More in-depth descriptions and examples of shielding for wireless energy transfer may be found in one or more of the above-noted commonly owned patent applications.

Figure 2B:
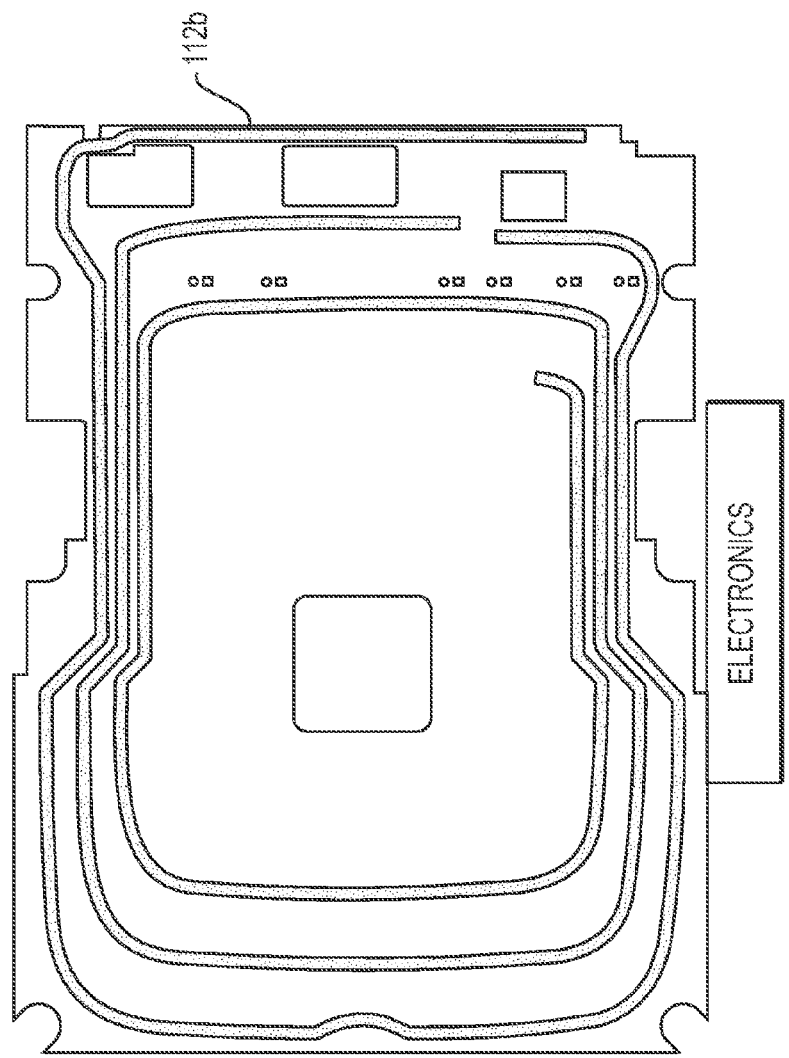
FIG. 2A is an example diagrammatic view of a device resonator coil according to one or more example implementations of the disclosure and FIG. 2B is an example diagrammatic view of a source resonator coil according to one or more example implementations of the disclosure.
Figure 2A:
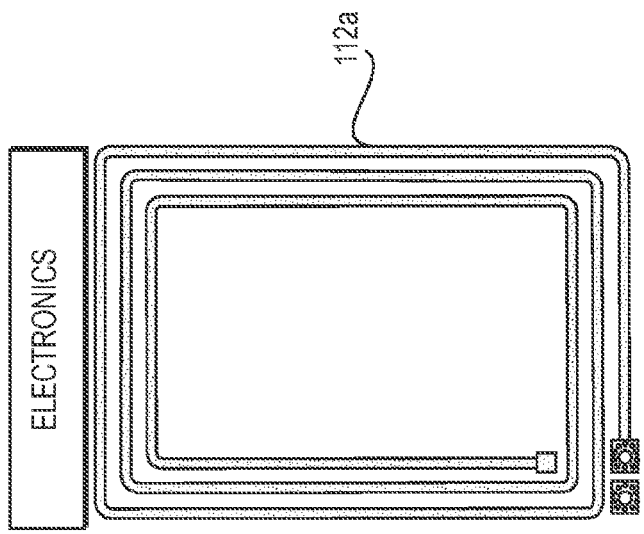

In some implementations, and referring at least to FIG. 2A, an example device resonator coil 112a is shown. As noted above, the resonator coil may be integrated in, e.g., a mobile electronic device, a sleeve, or case for a mobile electronic device, such as a mobile phone, a smartphone, a tablet, and the like. In some implementations, resonator coil 112a may be optimized for the mobile electronic device to efficiently receive, e.g., at least 3 W of power, at least 5 W of power, or greater, and the efficiency of power transfer may be, e.g., greater than 30%, greater than 50%, greater than 70%, or more. FIG. 2B shows an example implementation of a source resonator coil 112b that may be integrated into a pad, surface, tabletop, and like.

Figure 3:
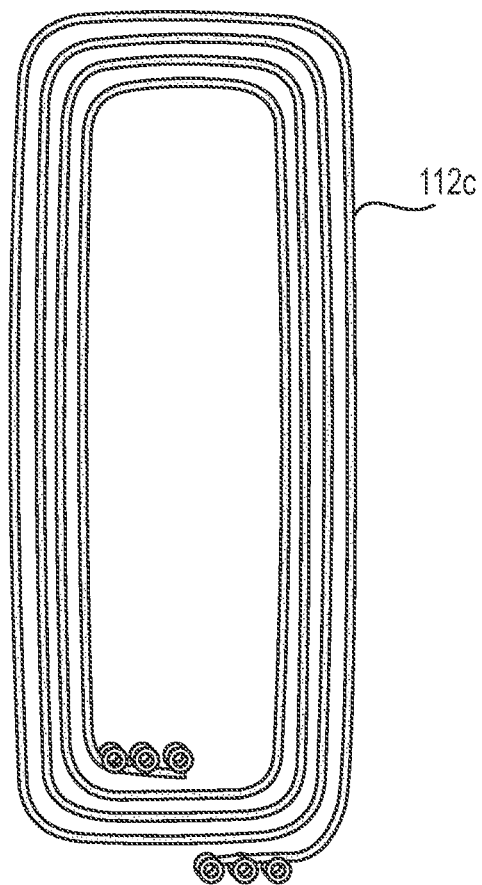
FIG. 3 is an example diagrammatic view of a device resonator according to one or more example implementations of the disclosure.

In some implementations, and referring at least to FIG. 3, another example device resonator coil 112c is shown. As noted above, the resonator coil may be integrated into a mobile electronic device, such as a Bluetooth headset, a sensor, a wearable, and the like. In some implementations, resonator coil 112c may be optimized for an electronic device to efficiently receive, e.g., at least 0.5 W of power, at least 1 W of power, or greater, and the efficiency of power transfer may be, e.g., greater than 10%, greater than 20%, greater than 30%, or more. More in-depth descriptions and examples of power transfer optimization for wireless energy transfer may be found in one or more of the above-noted commonly owned patent applications.

As noted above, the wireless energy exchange between the source resonator and the device resonator may be optimized when the resonators are tuned to substantially the same frequency and when the losses in the system are minimal. As a non-limiting example, devices, such as a smart phone, may be powered directly, using the wirelessly supplied power or energy, or the devices may be coupled to an energy storage unit such as a battery, a super-capacitor, an ultra-capacitor, or the like (or other kind of power drain), where the energy storage unit may be charged or re-charged wirelessly, and/or where the wireless power transfer mechanism may be supplementary to the main power source of the device.

However, while known resonator designs may be optimized while the source is at a distance from the device, these resonators may be less optimal in closer proximity. For instance, the source resonator may detune the device resonator as each resonator moves closer in proximity to one another. More specifically, for a wireless energy source having magnetic material, the inductance of the device resonator may be shifted as the device approaches the source, which may decrease efficiency. While magnetic material may be used to reduce losses in the magnetic field due to lossy materials in the environment or the electronics to which the source resonator is coupled, an inductance shift in the device resonator may still result in a greater-than-expected or lower-than-expected output voltage. For instance, in the example scenario of greater-than-expected output voltage, the device resonator may sustain damage to its electronics and/or to the load (such as a smart phone). In the example scenario of lower-than-expected output voltage, the device resonator may not be able to capture enough power for efficient operation.

Figure 4:
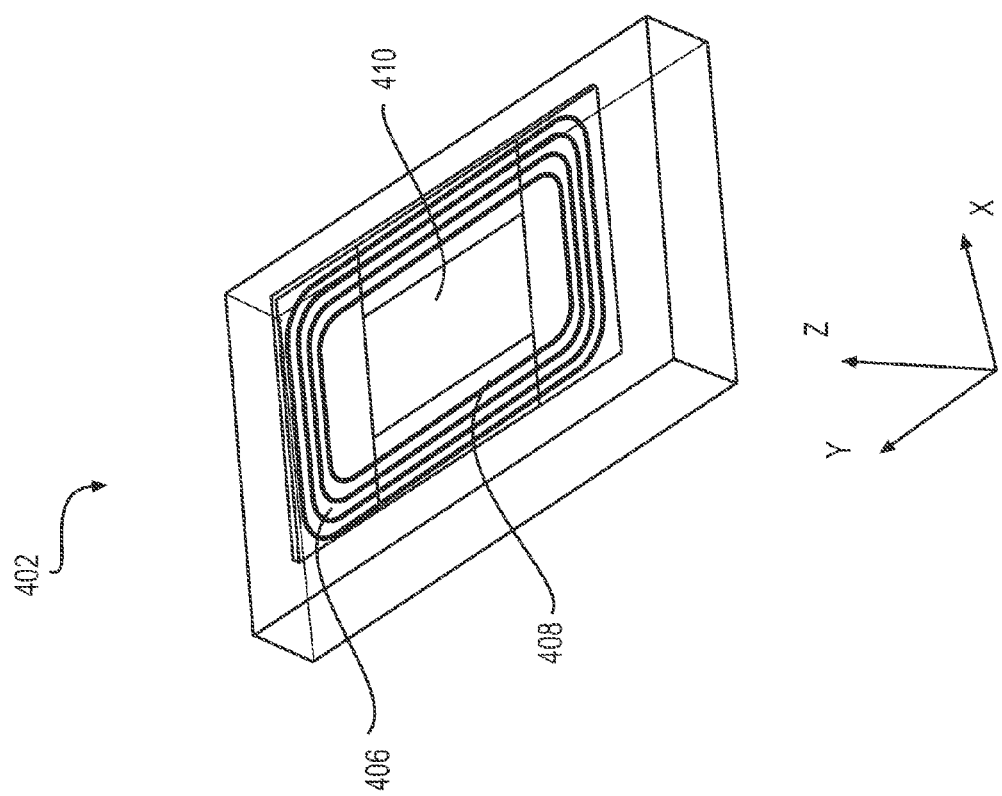
FIG. 4 is an example diagrammatic view of a wireless energy source according to one or more example implementations of the disclosure.
Figure 5:
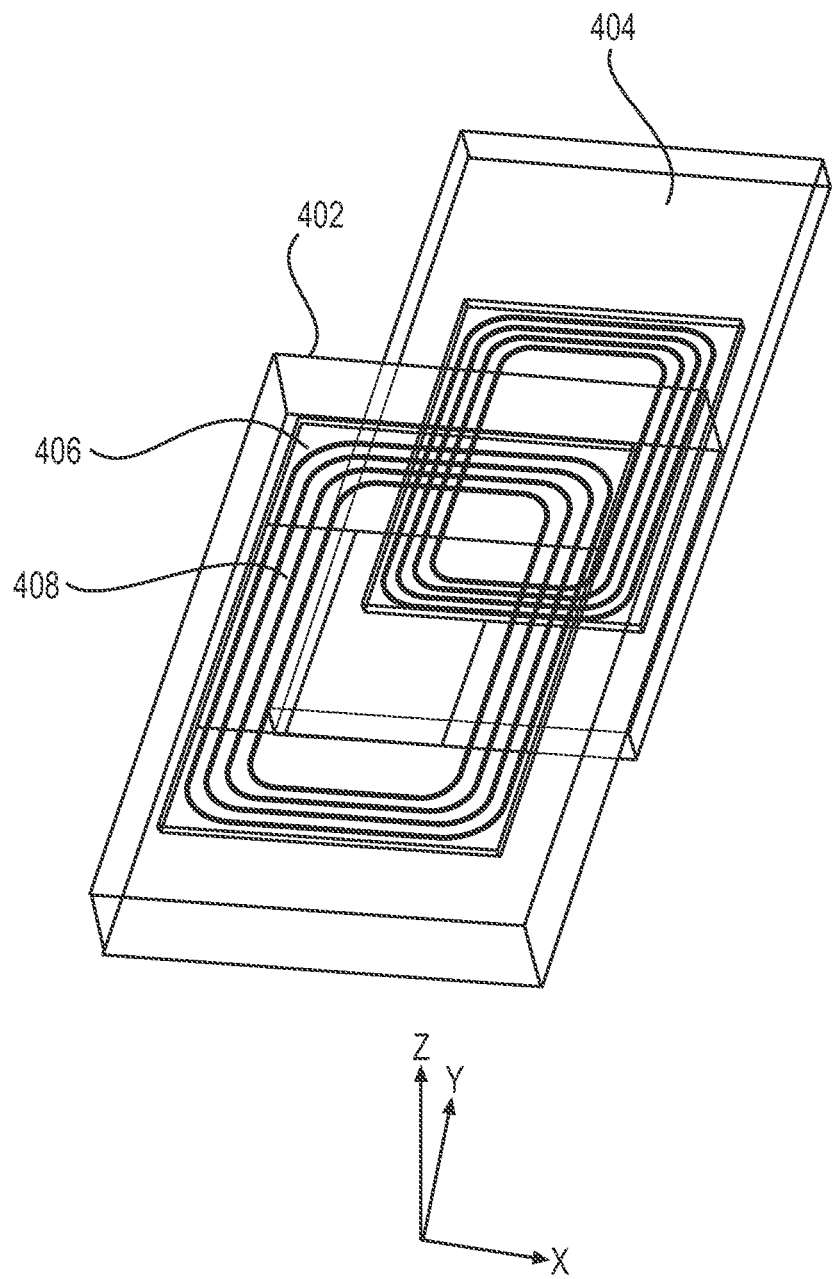
FIG. 5 is an example diagrammatic view of a wireless energy transfer system according to one or more example implementations of the disclosure.

Wireless Energy Transfer System with Multiple Pieces of Magnetic Material:

In some implementations, a source for wirelessly transferring energy may include a plurality of layers. For instance, one of the layers may include a conductive material (e.g., copper), which may be coupled to a power source. Another layer may include a magnetic material, and yet another layer may include a resonator that is configured to exchange wireless energy with another resonator when each resonator is in close enough proximity to one another. It will be appreciated that other layers may be included as well. As noted above, while magnetic material may be used to reduce losses in the magnetic field due to, e.g., lossy materials in the environment or the electronics to which the source resonator is coupled, an inductance shift in the device resonator may still result in a greater-than-expected or lower-than-expected output voltage. For instance, the inductance of the device resonator may be increased in response to nearby magnetic material (e.g., such as when the device approaches the source to wirelessly charge). In some implementations, to counter this increase, parts of the magnetic material used in the source may be removed or arranged. For example, as discussed above and referring also at least to FIGS. 4-5, a source resonator coil 406 with a center hole 410 in magnetic material 408 of an example source (e.g., source 402) may cause the inductance of a device resonator to return to approximately its original value. Put another way, the "original value" of the device inductance may be broadly described as the self-inductance of the device resonator in free space. In some implementations, and referring at least to FIG. 5, when an example device (e.g., device 404) is offset relative to source 402, the inductance may still shift, which may be caused by, e.g., device 404 being directly over magnetic material 408. For instance, assume for example purposes only that for a 20 mm by 40 mm positional translation relative to the center of source resonator 406, the inductance may still vary, e.g., about 17%. As another example, for a 10 mm by 20 mm positional translation relative to the center of source resonator 406, the inductance may still vary, e.g., about 5.6%.

Figure 6:
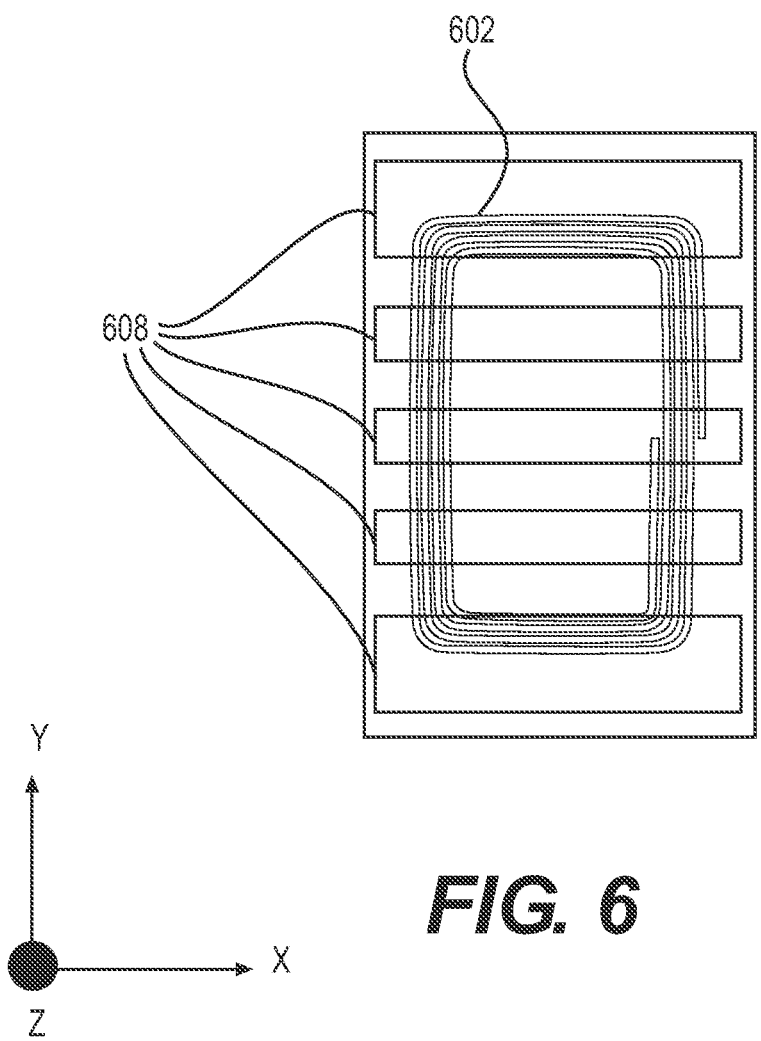
FIG. 6 is an example diagrammatic view of a wireless energy source according to one or more example implementations of the disclosure.

In some implementations, the size, shape, geometric position, or combination thereof of a plurality of pieces of the magnetic material in the source may reduce inductance shifting in the device resonator when proximate to the device resonator. For instance, and referring at least to FIGS. 6-7, to avoid shifting the inductance, the magnetic material may be arranged in a plurality of horizontal bars 608 proximate to source resonator coil 602. For instance, for an example 20 mm by 40 mm positional translation of device resonator coil 604 relative to the center of source resonator coil 602, the inductance may vary about 15%. For an example 10 mm by 20 mm positional translation relative to the center of source resonator coil 602, the inductance may vary about 4.3%.

Figure 8:
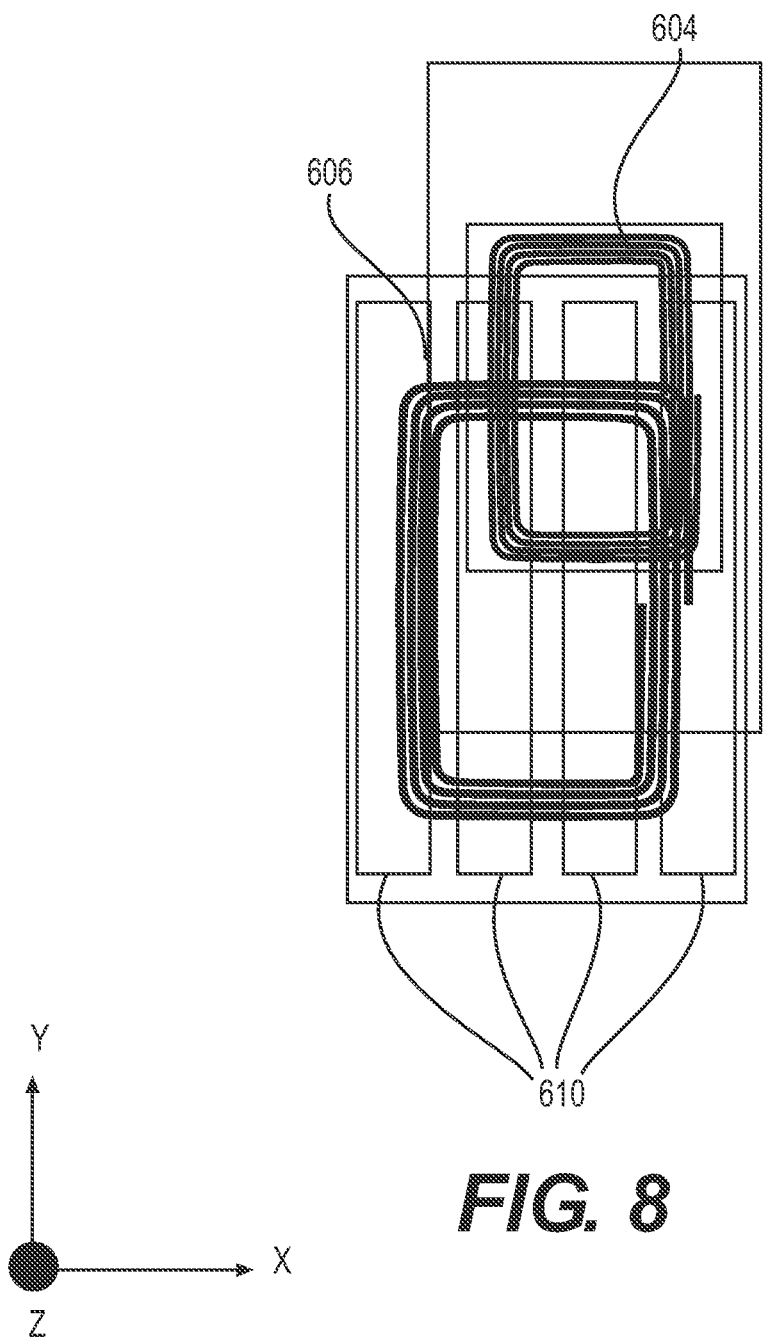
FIG. 8 is an example diagrammatic view of a wireless energy transfer system according to one or more example implementations of the disclosure.

As another example, and referring at least to FIG. 8, in some implementations, to avoid shifting the inductance, the magnetic material may be shaped and arranged in vertical bars 610 relative to source resonator coil 606. For instance, for a 20 mm by 40 mm positional translation of device resonator coil 604 relative to the center of source resonator coil 606, the inductance may vary about 17%. For an example 10 mm by 20 mm positional translation relative to the center of source resonator coil 606, the inductance may vary about 7.2%.

Figure 9:
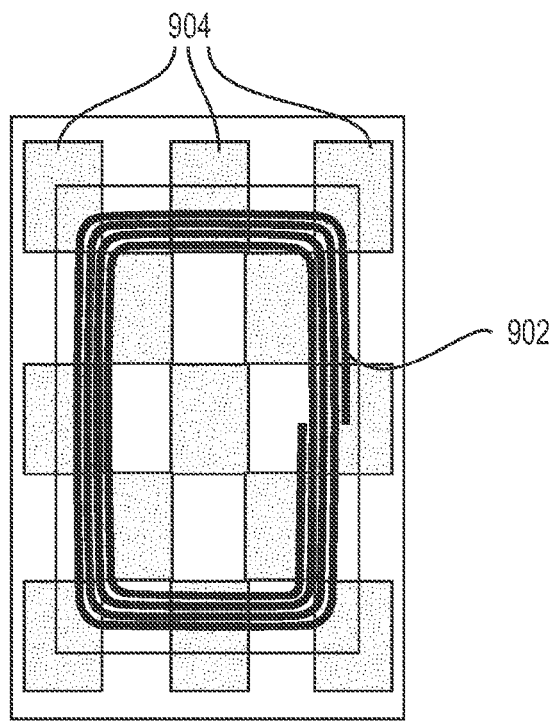
FIG. 9 is an example diagrammatic view of a wireless energy source according to one or more example implementations of the disclosure.
Figure 10:
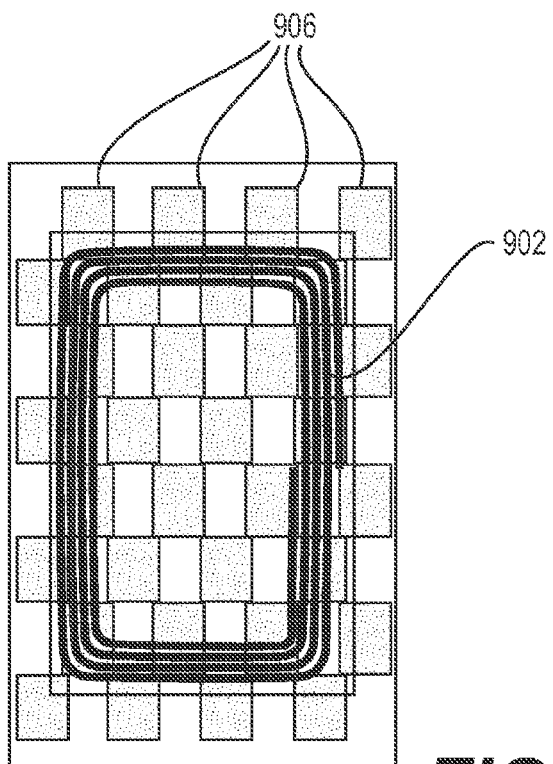
FIG. 10 is an example diagrammatic view of a wireless energy source according to one or more example implementations of the disclosure.

As yet another example, and referring at least to FIGS. 9-10, in some implementations, to avoid shifting the inductance, the magnetic material may be arranged in a checkerboard pattern relative to the source resonator coil 902. For instance, the checkerboard pattern of magnetic material may be coarser, such as shown in example FIG. 9, or more fine, such as shown in example FIG. 10. In the example shown in FIG. 9 with the coarse configuration of magnetic material 904, for an example 20 mm by 40 mm positional translation relative to the center of source resonator coil 902, the inductance may vary about 11%. For an example 10 mm by 20 mm positional translation relative to the center of source resonator coil 902, the inductance may vary about 2.2%. In the example shown in FIG. 10 with the fine configuration of magnetic material 906, for an example 20 mm by 40 mm positional translation relative to the center of source resonator coil 902, the inductance may vary about 12%. For an example 10 mm by 20 mm positional translation relative to the center of source resonator coil 902, the inductance may vary about 1.4%.

As such, by using different shapes, sizes, and geometric patterns of magnetic materials for the source, the amount of inductance shifting for the device resonator may be reduced. It will be appreciated that different shapes, sizes, geometric patterns and combinations thereof of magnetic material may be used without departing from the scope of the disclosure. For example, at least a first portion of the plurality of pieces of magnetic material may be a first shape (e.g., square), and at least a second portion of the plurality of pieces of the magnetic material may be a second shape (e.g., rectangular). As another example, at least a first portion of the plurality of pieces of magnetic material may be a first size (e.g., 10 mm by 20 mm), and at least a second portion of the plurality of pieces of the magnetic material may be a second size (e.g., 20 mm by 40 mm). As yet another example, at least a first portion of the plurality of pieces of magnetic material may be a first pattern (e.g., checkered pattern), and at least a second portion of the plurality of pieces of the magnetic material may be a second pattern (e.g., horizontal bars). As such, the description of particular sizes, shapes, and geometric patterns of magnetic material should be taken as example only and not to otherwise limit the scope of the disclosure. As will be discussed in greater detail below, similar variations in shapes, sizes, geometric patterns and combinations thereof of conductive material may be used, as well as mixing variations in shapes, sizes, geometric patterns and combinations thereof of conductive material and magnetic material may be used.

Wireless Energy Transfer System with Multiple Pieces of Conductive material:

As noted above, while magnetic material may be used to reduce losses in the magnetic field due to lossy materials in the environment or the electronics to which the source resonator may be coupled, an inductance shift in the device resonator may still result in a greater-than-expected or lower-than-expected output voltage. In some implementations, to avoid shifting the inductance of the device resonator, portions of the magnetic material and/or the source resonator coil of the source may be covered by conductive material.

As discussed above and referring also at least to FIG. 11A, an example source 1104 and device 1102 (not to scale) are shown. In the example, device 1102 may include a device resonator coil 1110 and a load (e.g., represented as part of a mobile electronic device 1106). In some implementations, a wireless energy transfer system may include a first layer of conductive material (e.g., conductive material 1114), wherein conductive material 1114 may be configured to cover some or all of the surface of a power supply 1112. In some implementations, the first layer of conductive material 1114 may be copper. However, it will be appreciated that other examples of conductive material, such as aluminum, may also be used without departing from the scope of the disclosure. In some implementations, the power supply may be a battery. However, it will be appreciated that other example power supplies may be used without departing from the scope of the disclosure.

In some implementations, a second layer of magnetic material (e.g., magnetic material 1116) may be positioned proximate to (e.g., between) the first layer of conductive material and a third layer. In some implementations, magnetic material 1116 may include ferrite. It will be appreciated that other magnetic materials may be used without departing from the scope of the disclosure. As discussed above, magnetic material 1116 may be used to shield device resonator coil 1110 from mobile electronic device 1106. In some implementations, magnetic material 1116 may have a thickness less than 1 mm. In some implementations, magnetic material 1116 may have a thickness less than 0.5 mm. However, it will be appreciated that magnetic material 1116 may have various other thicknesses depending on the desired characteristics of source 1104. In some implementations, the thickness of the magnetic material may depend on the expected power level of transfer. Magnetic materials may saturate when exposed to higher magnetic fields at higher power levels. Thus, thicker magnetic materials may have higher saturation points. For example, for a source transferring approximately 10 W of power, 0.3 mm of magnetic material may be sufficient. In some implementations, the thickness of magnetic material may additionally range from, e.g., 0.3 to 0.7 mm, 1 mm+, etc.

In some implementations, the third layer may be positioned proximate to (e.g., between) the second layer and a fourth layer, where the third layer may include a plurality of pieces of conductive material (e.g., pieces of conductive material 1118). As will be discussed in greater detail below, in some implementations, the pieces of conductive material 1118 placed between source resonator coil 1120 and magnetic material 1116 may have various shapes, sizes, and patterned positions (similar to the above discussion of the pieces of magnetic material, as well as shown at least in FIGS. 6-10).

In some implementations, the fourth layer may be positioned proximate to the third layer, wherein the fourth layer may include a first resonator coil (e.g., source resonator coil 1120), and wherein source resonator coil 1120 may be configured to transfer wireless energy with a second resonator coil (e.g., device resonator coil 1110) when source resonator coil 1120 is proximate to device resonator coil 1110 (e.g., within the charging area). For instance, as noted above, wireless energy transfer between a source resonator (e.g., which may be coupled to a power supply such as AC mains, battery, solar panels, etc.) and a device resonator (e.g., integrated with mobile devices, enclosures, sleeves, cases, covers, chargers, etc.) which as is also noted above, may be used to power or charge the associated (mobile) electronic device.

In some implementations, source resonator coil 1120 may include copper trace. For instance, source resonator coil 1120 may be designed within a printed circuit board (PCB) using known techniques. It will be appreciated that, as appropriate, a PCB may encompass numerous variations, such as a printed wiring board (PWB), a printed circuit assembly (PCA), printed circuit board assembly (PCBA), etc., or combination thereof. As such, where appropriate, the term "printed circuit board" or "PCB" used throughout may be interpreted as including one or more of the above-noted variations. In some implementations, at least one of the first, second, third, and fourth layers may be on different planes of the PCB. For instance, in the example, assume that at least a two layer (plane) PCB is used. In the example, the PCB may contain source resonator coil 1120 on the second layer (e.g., second plane) of the PCB, and the plurality of pieces of conductive material 1118 may be on one or more different layers (e.g., first plane) of the PCB. In some implementations, various combinations of plane locations may be used without departing from the scope of the disclosure. For instance, a portion of the plurality of pieces of conducting material 1118 may be located on one of the PCB planes, and a second portion of the plurality of pieces of conducting material 1118 may be located on another of the PCB planes. In some implementations, two of the planes may be the same plane. In some implementations, at least some of the layers need not be part of the PCB. For instance, in some implementations, conducting material 1114 may be a separate piece of material coupled to the top (or bottom) of the PCB. In some implementations, only the two layers of the conductive material may be within the PCB, where the remaining layers may be outside the PCB. As such, the description of any number of layers being within a PCB should be taken as an example only and not to limit the scope of the disclosure.

In some implementations, the traces of source resonator coil 1120 may be increased to increase its quality factor. For example, there may be a greater number of loops, greater amount of conductive material used to create the traces, and the like. More in-depth descriptions and examples of resonator quality factor (i.e., Q-factor) for wireless energy transfer may be found in one or more of the above-noted commonly owned patent applications. In response, the pieces of conductive material below source resonator coil 1120 may be decreased to compensate for the increased amount of conductive material that device resonator 1110 may "see" or be affected by.

It will be appreciated that the order of the above-noted source layers may be configured in a different order. For instance, referring at least to FIG. 11B, source 1104 may have a first layer consisting of conductive material 1114, a second layer consisting of magnetic material 1116, a third layer consisting of one or more source resonator coils 1120, and a fourth layer consisting of the plurality of pieces of conductive material 1118. In other words, in some implementations, the fourth layer consisting of the plurality of pieces of conductive material 1118 may be the outer layer that faces device 1102. As such, the described order of the "layers" should be taken as example only and not to otherwise limit the scope of the disclosure. Similarly, the use of the terms "first layer", "second layer", etc. need not denote a particular order of layers.

In some implementations, the first layer may be configured to be coupled to a surface of a mobile battery unit 1112. For instance, as noted above, the above example configurations may perform satisfactorily to exchange wireless energy at a size small enough to be integrated as part of a mobile battery unit without necessarily changing the footprint of the mobile battery unit itself. In some implementations, the "connection" to mobile battery unit 1112 may be a physical mechanical connection, as opposed to a direct electrical connection (or vice versa). In the example, the resonator may include, e.g., ferrite and metal shielding to prevent magnetic field interaction with mobile battery unit 1112.

In some implementations, as will be discussed in greater detail below, source 1104 may include a plurality of source resonators. For instance, in some implementations, two or more source resonators may be used side by side (e.g., horizontally or in the same plane as one another) with their respective horizontal axis aligned (or not aligned), as well as vertically (e.g., above/below) each other in different planes with their respective vertical axis aligned (or not aligned) to increase coupling between device resonator 1110 and at least one of the source resonators. In some implementations, the two or more source resonators may be connected in series and/or in parallel. As such, the description of a single (e.g., source) resonator should be taken as example only, and may be interpreted as being more than one source resonator.

In some implementations, and referring at least to FIG. 12A, a source resonator coil 1202 may be symmetric about axis 1204. In some implementations, source resonator coil 1202 may have a one or more loops (e.g., three or more loops, as shown in FIG. 12A) or four or more loops (as shown in FIG. 12C). It will be appreciated that any number of loops may be used according to the desired characteristics of source resonator coil 1202. For example, source resonator coil 1202 may be optimized for transferring power to a wireless device resonator approximately 3 mm in distance away from the surface of source resonator coil 1202 (in the Z-direction or out of the page). In some implementations, the source resonator coil 1202 may be optimized for the size of the device resonator coil and/or for different distances to the device resonator coil. For example the distance may be 3 mm, 5 mm, 10 mm, or greater.

Figure 12E:
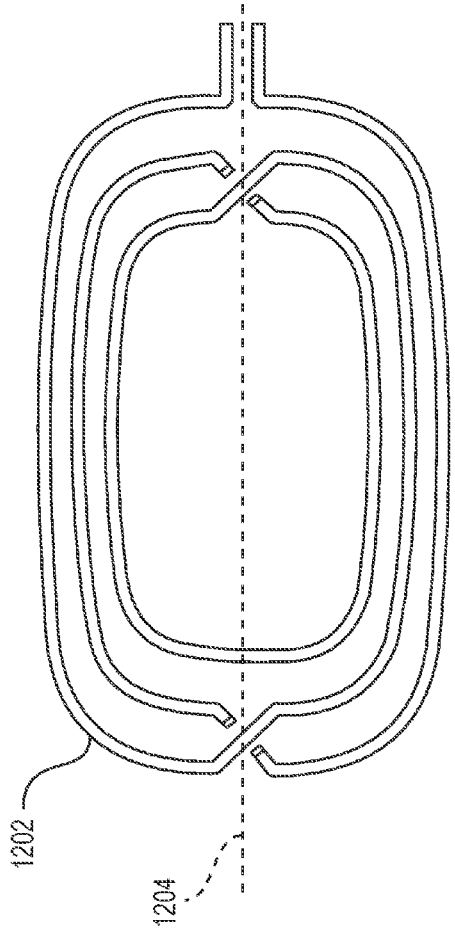

In some implementations, as discussed above and also referring at least to FIGS. 12A-12H, the pieces of conductive material 1118 placed between source resonator coil 1120 and magnetic material 1116 may have various shapes, sizes, and patterned (or non-patterned) positions (similar to the above discussion of the pieces of magnetic material at least in FIGS. 6-10). In some implementations, at least one of a size, a shape, and a geometric position of the plurality of pieces of conductive material 1118 may reduce inductance shifting in the device resonator coil 1110 when source resonator coil 1120 is proximate to device resonator coil 1110. For instance, the pieces of conductive material 1118 may be larger in size and placed closer to one another in the center of source resonator coil 1120 where there may be greater exposure to magnetic material, as seen by device resonator coil 1110. For example, FIG. 12B shows an example implementation with a plurality of conductive material pieces 1118 that may be placed under source resonator coil 1202 (e.g., aligning axis 1204 from FIG. 12A with axis 1204 from FIG. 12B) to decrease the variation in device resonator coil 1110 inductance. In the example, various shapes, sizes, and geometric patterns of the conductive material pieces 1118 are shown. For example, the shape may be a rectangle. As yet another example, the shape may be a square. As yet another example, at least a first portion of the plurality of pieces of the conductive material 1118 may be a first shape, and wherein at least a second portion of the plurality of pieces of the conductive material 1118 may be a second shape. As yet another example, at least a portion of the plurality of pieces of the conductive material 1118 may be horizontal relative to a center of the first resonator coil. As yet another example, at least a portion of the plurality of pieces of the conductive material 1118 may be vertical relative to a center of the first resonator coil. As yet another example, at least a portion of the plurality of pieces of the conductive material 1118 may be arranged in a checkered pattern relative to the first resonator coil. As can be seen from FIG. 12B, the pieces of conductive material 1118 may be more dense and/or of greater size towards the center of source resonator coil 1202. In some implementations, as noted above, the plurality of pieces of conductive material 1118 may be copper (or other conductive material).

As another example, and referring at least to FIGS. 12C-12D, source resonator coil 1206 may have four turns of conductive trace and be optimized for transferring power to a wireless device resonator approximately 3 mm or greater in distance away from the surface of source resonator coil 1206 (e.g., in the Z-direction or out of the page). Similar to FIG. 12B, FIG. 12D shows an example implementation of conductive material pieces 1118 placed under source resonator coil 1206 (e.g., aligning axis 1208 from FIG. 12C with axis 1208 from FIG. 12D) to decrease the variation in the device resonator coil inductance. In the example implementation, the pieces of conductive material may be more dense and/or of greater size towards the center of source resonator coil 1206.

Figure 12F:
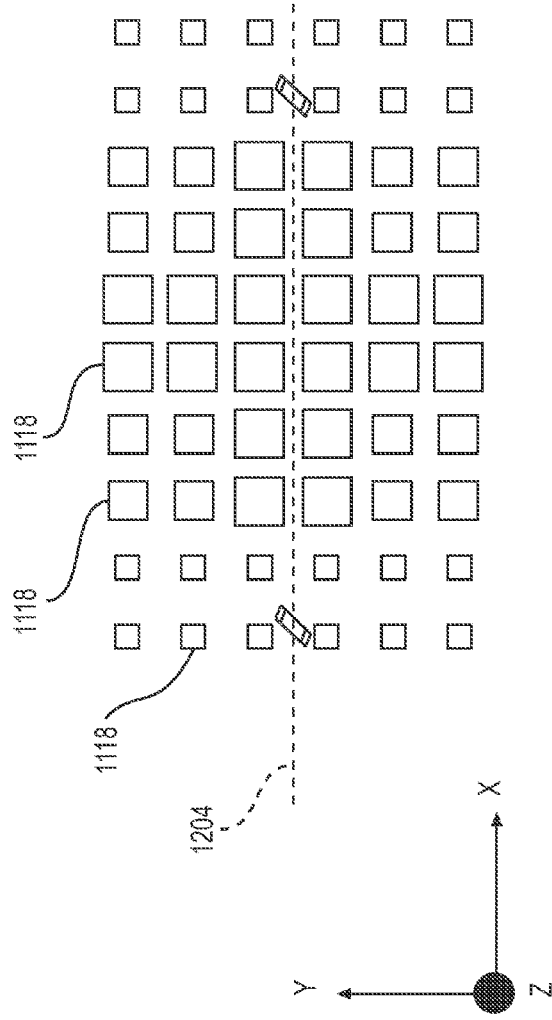

As another example, and referring at least to FIGS. 12E-12F, source resonator coil 1202 (also shown in FIG. 12A) may be optimized for transferring power to a wireless device resonator approximately 3 mm or greater in distance away from the surface of source resonator coil 1202 (e.g., in the Z-direction or out of the page). Similar to FIG. 12B, FIG. 12F shows an example implementation of conductive material pieces 1118 placed under source resonator coil 1202 (e.g., aligning axis 1204 from FIG. 12E with axis 1204 from FIG. 12F) to decrease the variation in the device resonator coil inductance. In the example, the pieces of conductive material 1118 may be slightly more uniform in shape, size, and pattern in the center of source resonator coil 1202 as compared to FIG. 12B.

Figure 12G:
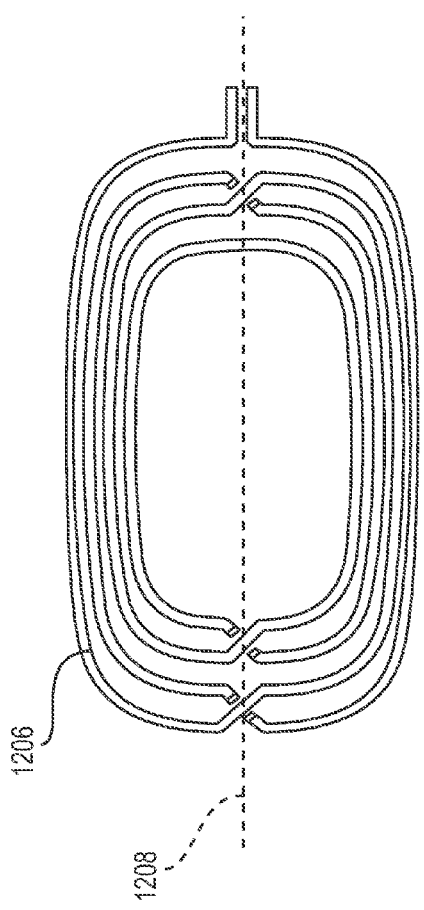
Figure 12H:
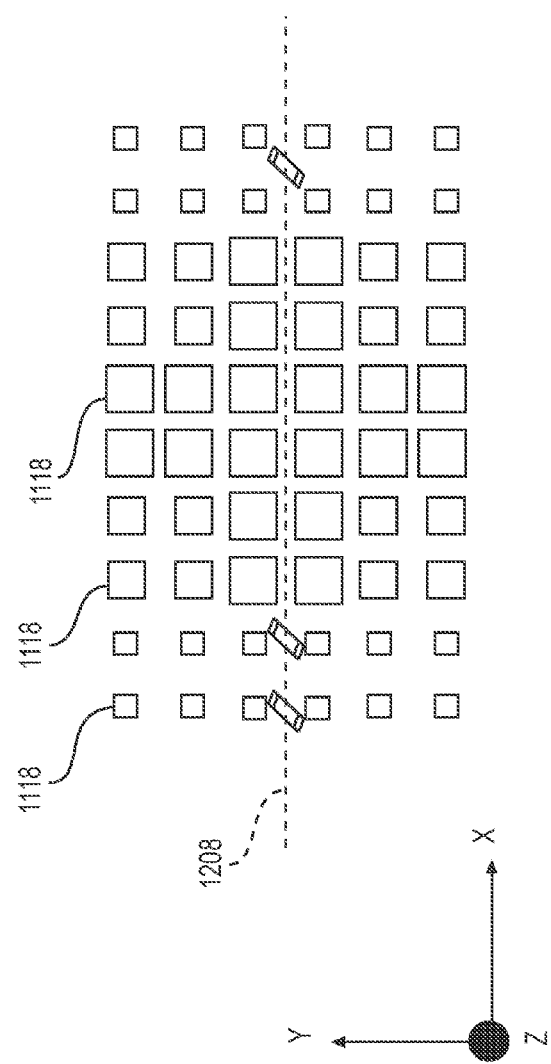

As another example, and referring at least to FIGS. 12G-12H, source resonator coil 1206 (also shown in FIG. 12C) may be optimized for transferring power to a wireless device resonator approximately 3 mm or greater in distance away from the surface of source resonator 1206 (e.g., in the Z-direction or out of the page). Similar to FIG. 12B, FIG. 12H shows an example implementation of conductive material pieces 1118 placed under source resonator coil 1206 (e.g., aligning axis 1208 from FIG. 12G with axis 1208 from FIG. 12H) to decrease the variation in the device resonator coil inductance. In the example, the pieces of conductive material 1118 may be slightly more uniform in shape, size, and pattern in the center of source resonator coil 1202 as compared to FIG. 12B.

It will be appreciated that other source and resonator designs may be used according to desired characteristics without departing from the scope of the disclosure. For example, and referring at least to FIG. 13, an example resonator coil 1302 may be optimized for transferring power to a wireless device resonator approximately up to and including 46 mm in distance away from the surface of source resonator coil 1302 (e.g., in the Z-direction or out of the page). In the example, the resonator coil 1302 may be approximately 142 mm by 192 mm. Further in the example, source resonator coil 1302 may be able transfer equal to or greater than 10 W of power, greater than 15 W of power, greater than 30 W, or more.

Figure 14A:
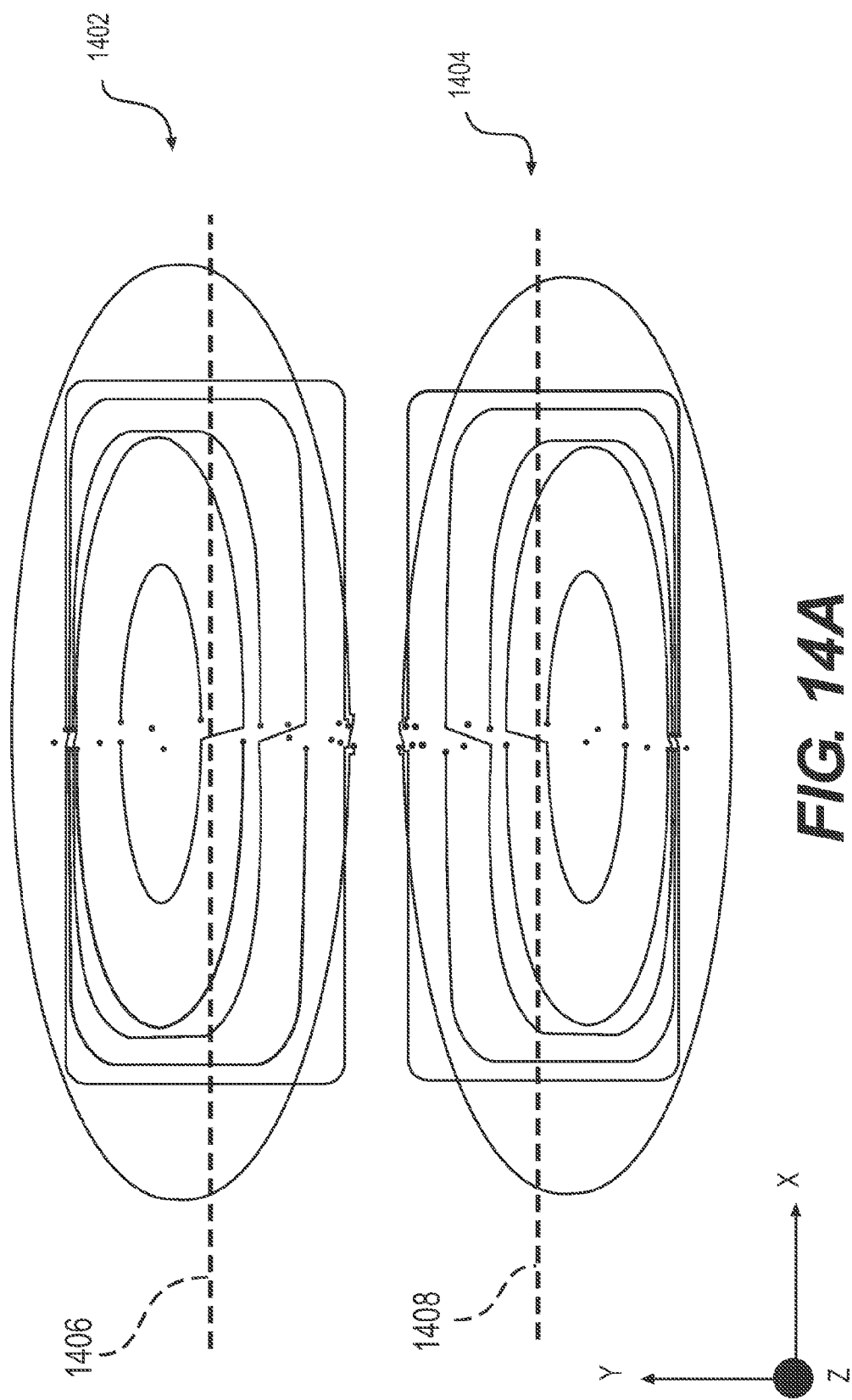
FIG. 14A is an example diagrammatic view of one or more source resonator coils according to one or more example implementations of the disclosure.

In some implementations, as noted above, source 1104 may include a plurality of source resonators. For instance, and referring at least to FIG. 14A, an example two-layered resonator coil for a wireless energy source is shown. That is, layer 1404 may include one source resonator coil, and layer 1404 may include another source resonator coil. As such, the description of a single source resonator coil should be taken as example only. In the example, the resonator coil may be optimized for transferring power to a wireless device resonator at approximately, e.g., 6 mm (±1 mm) in distance away from the surface of the source resonator (e.g., in the Z-direction or out of the page). For instance, the two layers 1402 and 1404 of the resonator coil may be printed on two layers of a PCB, where axis 1406 may align with axis 1408. The example source resonator coils may be able to transfer greater than 30 W of power. In some implementations, it may be beneficial to have two or more layers of resonator coils to produce a magnetic field with minimum variation in strength in one or more directional components. For example, a two-layer resonator coil may minimize variation in the strength of the vertical component of the magnetic field. The multi-layer nature of the resonator coil may enable greater movement in both the X and Y offsets of the device resonator by creating a sufficiently large active area. In some implementations, the active area may be defined as the area over which the variation in the magnetic field is minimized. In some implementations, the two layers of the PCB containing each portion of the resonator coil may be printed on the PCB such that the layers are far apart enough to reduce or eliminate the parasitic capacitance that may occur between the traces on the two layers. In some implementations, the layers containing each portion of the resonator coil may be at least 0.5 mm apart, at least 1 mm apart, at least 2 mm apart, at least 4 mm apart, or greater. In some implementations, the two layers of the PCB containing each portion of the resonator coil may be printed on a circuit board such that the layers are far apart enough to reduce or eliminate the self-resonance of the resonator.

Figure 14C:
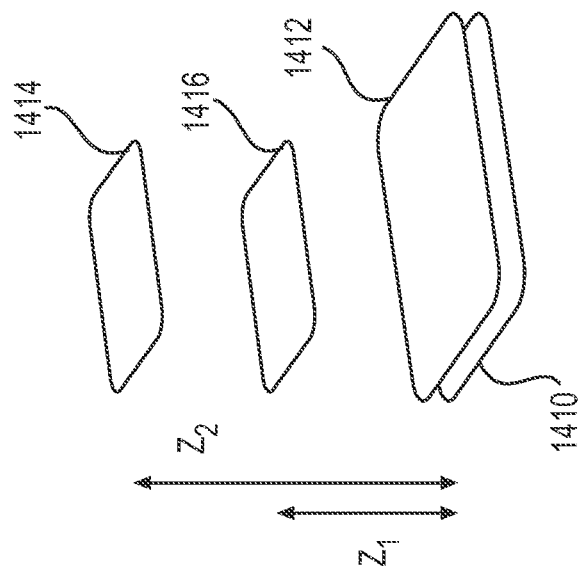
FIGS. 14B-14C are example diagrammatic views of wireless energy transfer systems according to one or more example implementations of the disclosure.
Figure 14B:
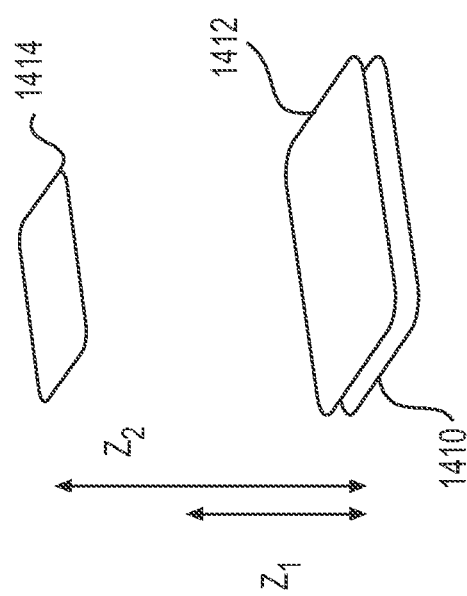

In some implementations, and referring at least to FIG. 14B, an example of a wireless power system is shown with two or more source resonators (e.g., 1410 and 1412) and a device resonator (e.g., 1414). In the example, source resonators 1410 and 1412 may be switchably coupled to a controller that may switch between source resonator 1410 and 1412 respectively to transfer power at a height of $Z_1$ and/or $Z_2$. In some implementations, and referring at least to FIG. 14C, an example of a wireless power system is shown with two or more source resonators (e.g., 1410 and 1412) and two or more device resonators (e.g., 1414 and 1416). In some implementations, a controller may switch between two different source resonators 1410 and 1412, which may be configured for maximum field uniformity and/or maximum resonator coil-to-coil efficiency. For instance, in one example, a controller may switch to one of the source resonators 1410, 1412 for maximum field uniformity at low Z-height Z1 for the closer device resonator 1416. In another example, a controller may switch to one of the other source resonators 1410, 1412 for maximum resonator coil-to-coil efficiency at a high Z-height Z2 for the further device resonator 1414. In some implementations, a controller may switch between two different source resonators 1410 and 1412 depending on the size of the device resonator. For example, source resonators 1410 and 1412 may be sized differently such that they can transfer power efficiently to different sized device resonators. One of the source resonators may be smaller than the other and therefore may be able to accommodate a small device resonator. The larger of the two source resonators may be turned off to conserve energy while the smaller source resonator may efficiently transfer energy to the small device resonator.

Figure 14D:
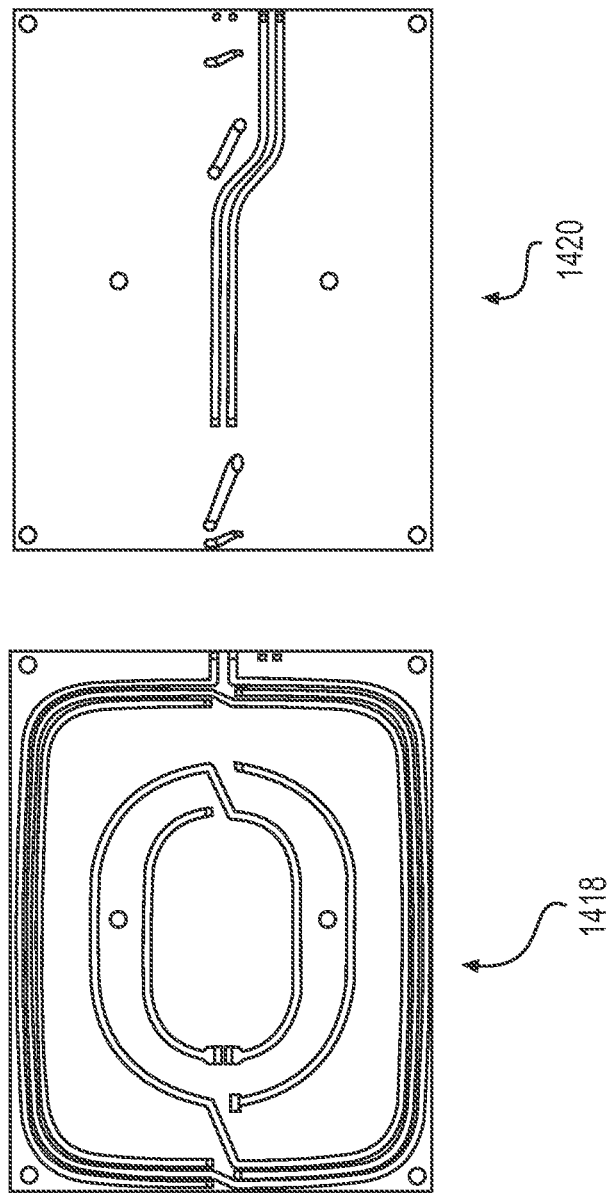
FIG. 14D is an example diagrammatic view of layers of a source resonator coil according to one or more example implementations of the disclosure.

In some implementations, and referring at least to FIG. 14D, two sides of an example source resonator (front side 1418 and back side 1420) are shown that may be formed on a PCB. In the example, the resonator may be able to transfer approximately, e.g., 16 W of power at a Z-height of 5 mm. The resonator may include a distributed capacitance of, e.g., 220 pF±2%. In the example, the resulting charging area at a Z-height of 5 mm may be an area of, e.g., 160 mm by 150 mm.

In some implementations, and referring at least to FIG. 15, an example resonator coil 1502 for a wireless energy source is shown. In the example, resonator coil 1502 may be optimized for transferring power to a wireless device resonator approximately between and including 26 mm and 46 mm in distance away from the surface of source resonator coil 1502 (e.g., in the Z-direction or out of the page). In some implementations, source resonator coil 1502 may be able to transfer greater than, e.g., 30 W of power. In some implementations, source resonator coil 1502 may be made of two resonator coils placed in parallel or series.

Wireless Energy Transfer System with Crossover Tracing:

In some implementations, a source resonator coil may be shaped (e.g., via the windings of the resonator coil) to achieve a uniform charging area. For example, a uniform charging area may allow a device (via a device resonator) to be charged at similar power levels throughout the charging area (via a source resonator). In another example, a uniform charging area may allow for similar low loss rates throughout the charging area, thereby increasing efficiency. As will be discussed in greater detail below, balancing currents throughout a coil (e.g., with parallel windings) may help achieve a uniform charging area and magnetic field, as well as creating a symmetric resonator coil.

As discussed above and referring also at least to FIGS. 16-20, a wireless energy transfer system may include a first resonator coil. For example, a wireless energy transfer system may include a source resonator coil 1602, wherein source resonator coil 1602 may be configured to transfer wireless energy to a second/device resonator coil (e.g., of a device resonator) when source resonator coil 1602 is proximate to the device resonator coil. For instance, as noted above, wireless energy transfer to a source resonator (e.g., coupled to a power supply such as AC mains, battery, solar panels, etc.) and a device resonator (e.g., integrated with mobile devices, enclosures, sleeves, cases, covers, chargers, etc.) may be used to power or charge the associated mobile electronic device. In some implementations, similar to the discussions of FIG. 11A, the source may include: a first layer of conductive material, wherein the conductive material may be configured to be coupled to a power source; a second layer of magnetic material positioned proximate to the first layer of conductive material and a third layer; the third layer positioned proximate to the second layer and a fourth layer, where the third layer may include a plurality of pieces of conductive material; the fourth layer positioned proximate to the third layer, wherein the fourth layer may include source resonator coil 1602. In some implementations, the third layer may include source resonator coil 1602; the fourth layer positioned proximate to the third layer, wherein the fourth layer may include a plurality of pieces of conductive material. In some implementations, the source may be configured similarly to the above-noted discussions of FIG. 11A or 11B. However, it will be appreciated that other combinations of source configurations may be used without departing from the scope of the disclosure.

Figure 16:
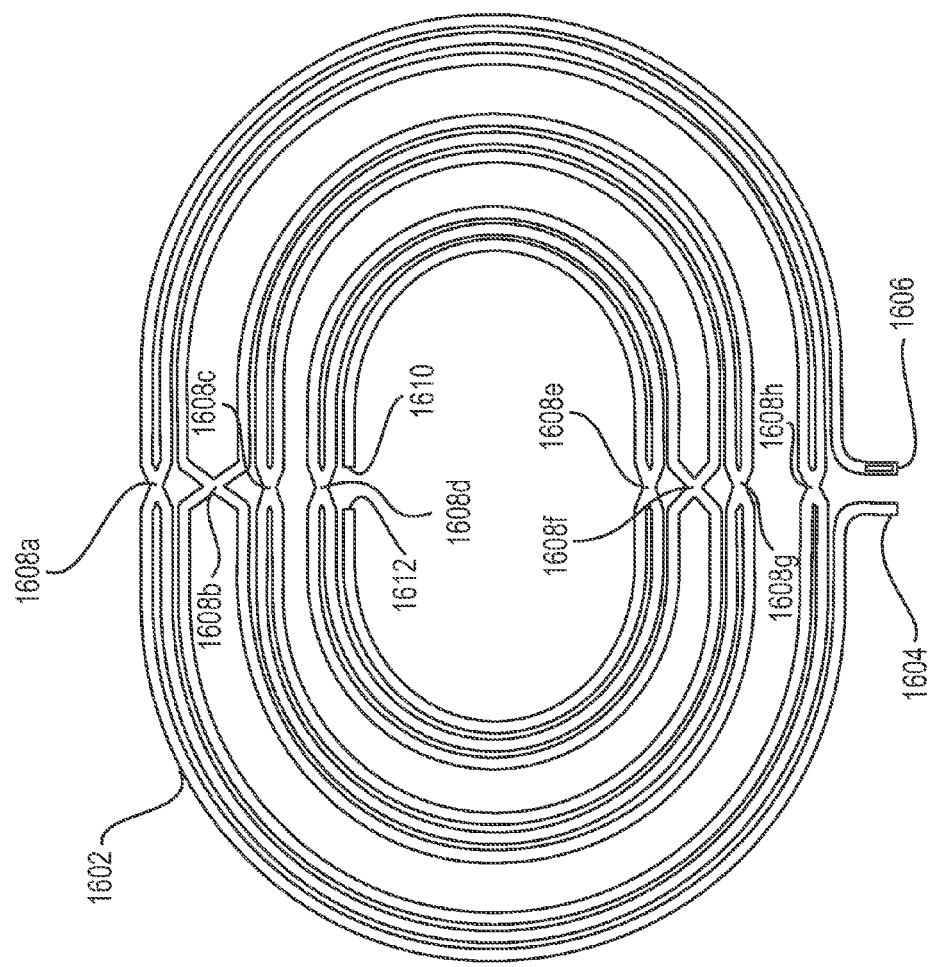
FIG. 16 is an example diagrammatic view of a source resonator coil according to one or more example implementations of the disclosure.

In some implementations, and referring at least to FIG. 16, a first winding of trace (e.g., winding 1604) may be included in source resonator coil 1602, wherein winding 1604 may include conductive material. A second winding of trace (winding 1606) may be included in source resonator coil 1602, wherein winding 1606 may include conductive material. In some implementations, the trace of at least one of the first winding and second winding may include copper coil for the conductive material.

In some implementations, windings 1604 and 1606 of the source resonator coil 1602 may be crossed, interleaved, or overlapped at a crossover point. In some implementations, having a cross point in the coil windings may help balance currents throughout the coil with parallel windings. For example, a portion of the trace for winding 1604 may cross over a portion of the trace for winding 1606 at a crossover point (e.g., crossover point 1608a, 1608b, 1608c, 1608d, 1608e, 1608f, 1608g, and/or 1608h). In some implementations, crossing the windings may help to balance or approximately equate the currents (in each winding) relative to one another. Thus, in some implementations, the crossing of the coil windings may help achieve a symmetric resonator coil, which may enable a more uniform magnetic field and charging area. In some implementations, such as source resonator coil 1602, the windings of the coil may be evenly spaced to help achieve the uniform charging area. In some implementations, the crossover points may be beneficial in containing the resonator coil in a plane. For example, many source enclosures restrict the resonator coil to be in a flat and thin pad-like mechanical enclosure such that it may have a low profile on a surface or be mounted below a table.

For example, source resonator coil 1602 may be able to transfer approximately 16 W of power at a Z-height of, e.g., 46 mm. The charging area that may result from this implementation at a height of 46 mm may be an area of around, e.g., 140 mm by 120 mm. In some implementations, two of the windings may be connected in parallel. For example, windings 1604 and 1606 may be connected in parallel (e.g., winding 1604 may be connected to 1610, and winding 1606 may be connected to 1612). In some implementations, the crossover points may create a symmetrical resonator coil that creates a uniform magnetic field and balances impedances along different paths for traces driven in parallel. In some implementations, source resonator coil 1602 may include one or more capacitors connected to windings at 1612 and 1610 to form a source resonator. In implementations, the source resonator coil, such as the source resonator coil shown in FIG. 16, may have uniform spaces between windings such that greater amount of conductive trace is used and therefore results in a resonator coil with a greater quality factor.

In some implementations, a second portion of the trace for winding 1604 may cross over a second portion of the trace for winding 1606 at a symmetrical crossover point. For example, as can be seen at least from FIG. 16, windings 1604 and 1606 may be configured to form multiple crossover points (e.g., crossover point 1608a, 1608b, 1608c, 1608d, 1608e, 1608f, 1608g, and/or 1608h). In the example, crossover point 1608d may be symmetrical to crossover point 1608e. As another example, crossover point 1608b may be symmetrical to crossover point 1608f. It will be appreciated that non-symmetrical crossover points may be used without departing from the scope of the disclosure.

In some implementations, the crossover point may occur in a middle portion of resonator coil 1602. For example, as can be seen at least at FIG. 16, the crossover points are located in the middle portion of resonator coil 1602. By contrast, the crossover point may occur in an end portion of resonator coil 1602. For instance, and referring at least to FIG. 12A, two crossover points are shown at the end portions of resonator coil 1202 along axis 1204. That is, the two crossover points are shown at the elongated ends of resonator coil 1202. In some implementations, the crossover points may be located at a combination of middle and end portions of the resonator coil, as well as at any other portions of the resonator. As such, the description of specific locations of crossover points should be taken as example only and not to otherwise limit the scope of the disclosure.

Figure 17:
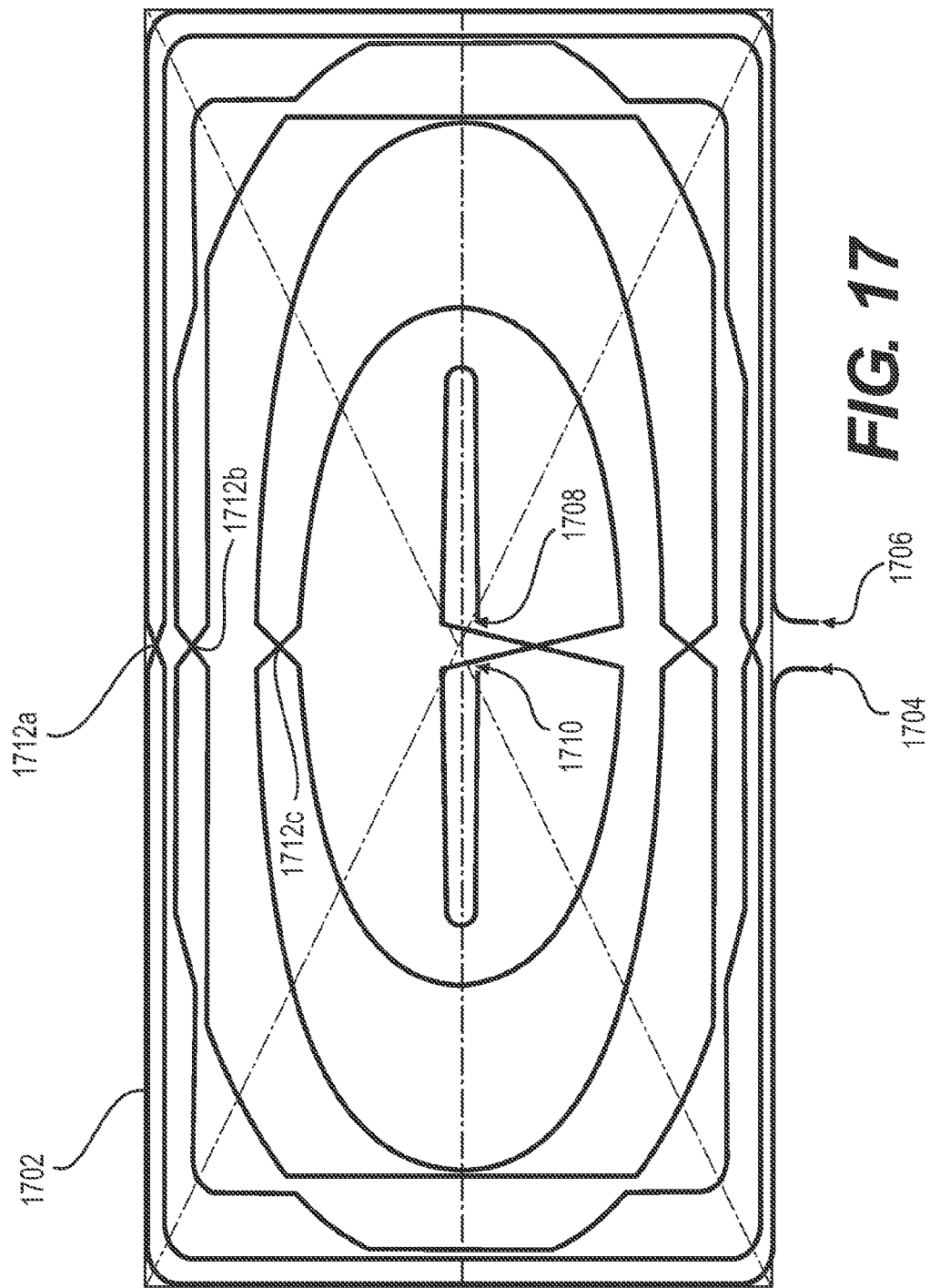
FIG. 17 is an example diagrammatic view of a source resonator coil according to one or more example implementations of the disclosure.

In some implementations, and referring at least to FIG. 17, another example resonator coil 1702 with crossover points is shown. For example, source resonator coil 1702 may be able to transfer approximately, e.g., 16 to 33 W of power at Z-height of, e.g., 6 mm. In the example, the resulting charging area at a Z-height of 6 mm may be an area of, e.g., 300 mm by 140 mm. In some implementations, resonator 1702 may include rounded and squared-off shapes to help achieve a uniform magnetic field/charging area for a given charging area. In the example, resonator coil 1702 includes two windings 1704 and 1706, connected in parallel (e.g., winding 1704 may be connected to 1708, and winding 1706 may be connected to 1710). Further in the example, windings 1704 and 1706 may create crossover points (e.g., crossover points 1712a, 1712b, 1712c, as well as other non-labeled crossover points shown in FIG. 17). In some implementations, source resonator coil 1702 may include one or more capacitors connected to windings at 1710 and 1708.

In some implementations, and referring at least to FIG. 18, another example resonator coil 1802 with crossover points is shown. For example, source resonator coil 1802 may be able to transfer approximately, e.g., 33 W of power at Z-height of, e.g., 26 mm and 46 mm. In the example, the resulting charging area at a Z-height of 26 mm may be an area of, e.g., 220 mm by 150 mm. The resulting charging area at a Z-height of 46 mm may be an area of, e.g., 210 mm by 140 mm. In some implementations, resonator coil 1802 may include two windings 1804 and 1806 connected in parallel (e.g., winding 1804 may be connected to 1808, and winding 1806 may be connected to 1810). Further in the example, windings 1804 and 1806 may create crossover points (e.g., crossover points 1812a, 1812b, 1812c, as well as other non-labeled crossover points shown in FIG. 18). In some implementations, source resonator coil 1802 may include one or more capacitors connected to windings at 1810 and 1808.

Figure 19A:
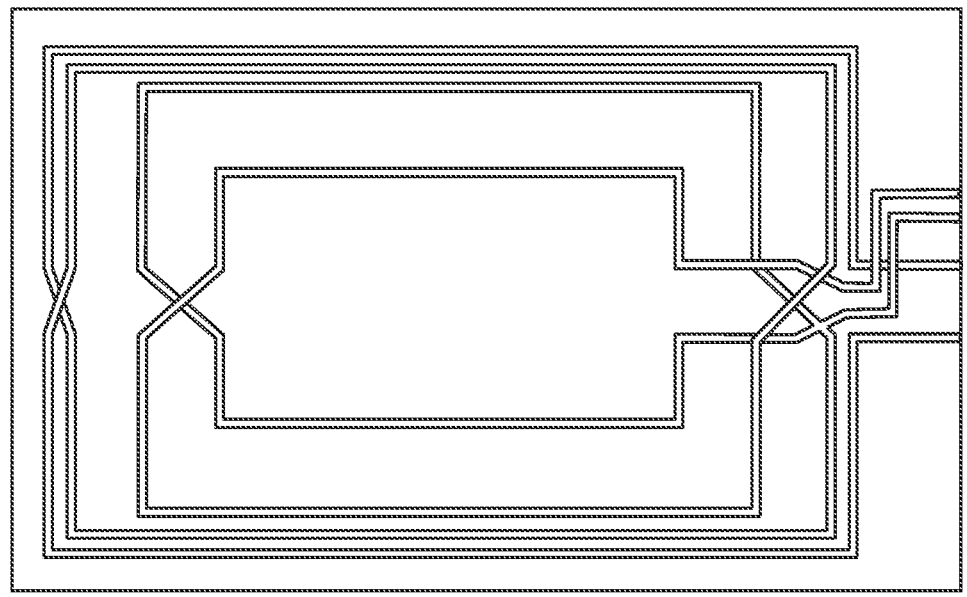
FIGS. 19A-19B are example diagrammatic views of source resonator coils according to one or more example implementations of the disclosure.
Figure 19B:
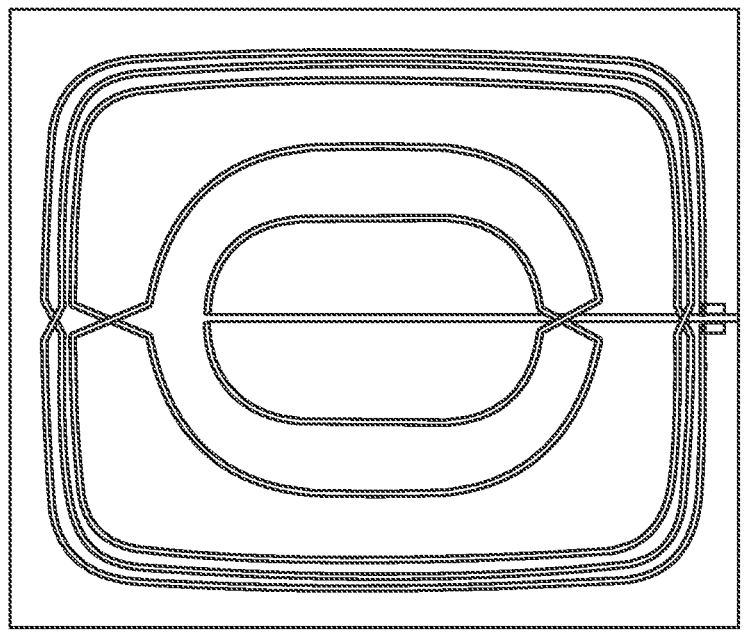

It will be appreciated that other resonator coil designs may use crossover points. For instance, example resonator coil designs that may use crossover points are similarly shown in the above-noted FIGS. 12A, 12C, 12E, and 12G. Additional example resonator coil designs that may use crossover points are shown at FIGS. 19A and 19B, discussed below. As such, the description of any particular resonator coil design using crossover points should be taken as example only and not to otherwise limit the scope of the disclosure.

In some implementations, the portion of the trace for the first winding may cross over the portion of the trace for the second winding at the crossover point with insulation between the portion of the trace for the first winding and the portion of the trace for the second winding. For instance, assume for example purposes only that the above-noted resonator coil 1602 from FIG. 16 is constructed on a single layer PCB. In the example, there may be insulation between winding 1604 and 1606 at the crossover point (e.g., 1608a).

In some implementations, the first resonator coil may be printed on a PCB, wherein the portion of the trace for the first winding may stop on a first side of the printed circuit board at the crossover point and may continue on a second side of the printed circuit board, wherein the portion of the trace for the second winding on the second side of the printed circuit board may stop on the second side and may continue on the first side after the crossover point. In some implementations, the portion of the trace for the first winding may cross over the portion of the trace for the second winding at the crossover point using different layers of a PCB. For instance, the portion of the trace for the first winding may stop on the first side of the portion of the trace for the second winding on a first layer of a printed circuit board before reaching the crossover point, and may continue on the second side of the portion of the trace for the second winding on a second layer of the printed circuit board after reaching the crossover point.

Figure 20:
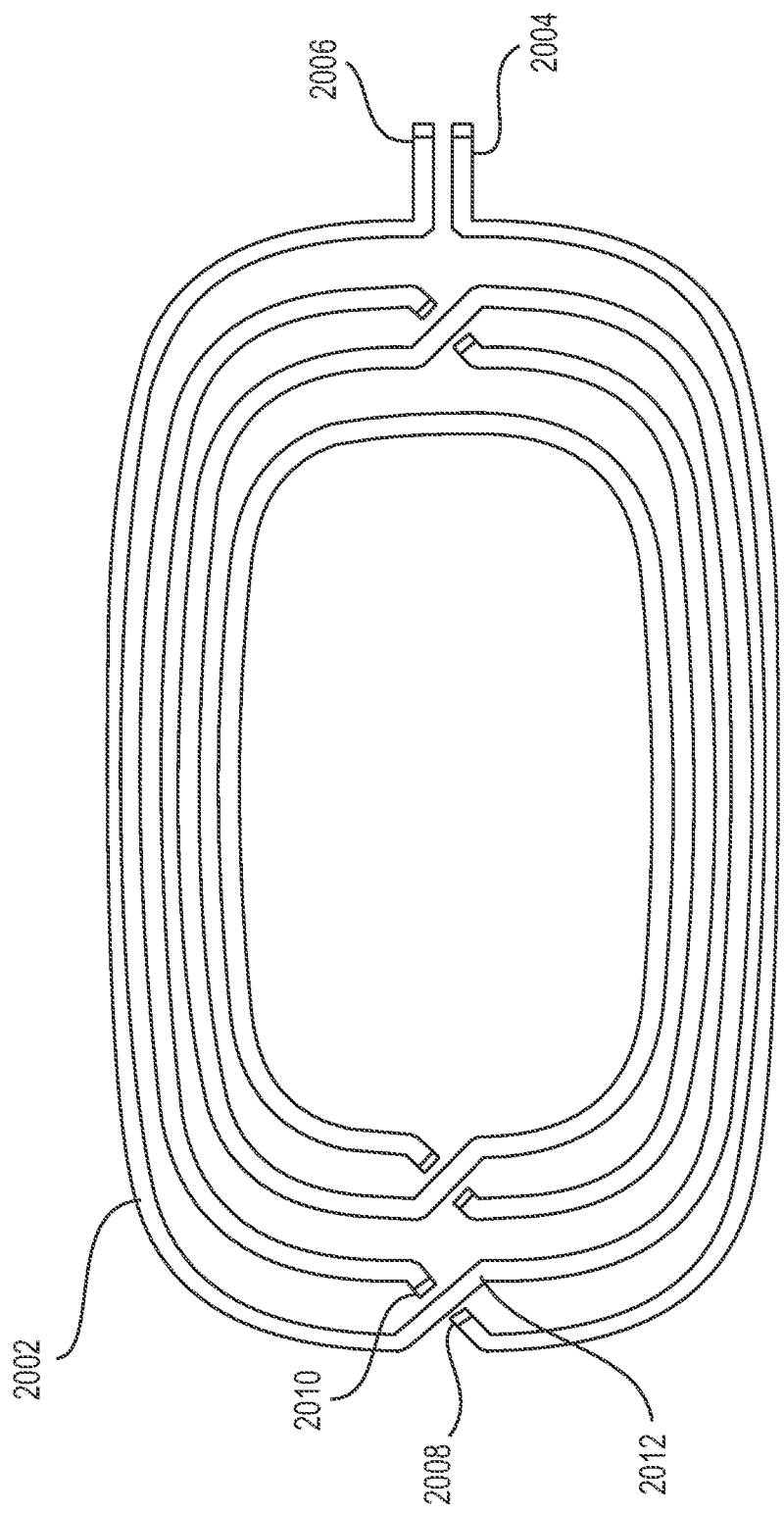
FIG. 20 is an example diagrammatic view of a source resonator coil according to one or more example implementations of the disclosure.

For instance, and referring at least to FIG. 20, an example resonator coil 2002 is shown. Assume for example purposes only that resonator coil 2002 is constructed on a two layer PCB, with winding 2004 and 2006. In the example, winding 2004 may cross over winding 2006 by having the trace of winding 2004 stop at point 2008 on the top layer of the PCB, and then continue at point 2010 on the bottom layer of the PCB (or vice versa).

It will be appreciated that other techniques to create crossover points may be used without departing from the scope of the disclosure. As such, the example descriptions of crossover techniques should be taken as example only and not to limit the scope of the disclosure.

Wireless Energy Transfer System with Current Sensing:

Known current sensing techniques that may be used for wireless energy transfer may, include, e.g., pickup loops around the trace or wire, Hall Effect sensors, current sense transformers, current sense resistors, etc. These techniques may, e.g., have excessive loss and power dissipation for the high current and high frequencies used in wireless energy transfer, may have frequency restrictions used in wireless energy transfer, may be susceptible to magnetic interference, may be expensive, and, assuming the techniques are incorporated in the device itself, may add to the size of the overall devices for which the current is being measured.

Additionally, in measuring current in, e.g., a highly resonant wireless power transfer system, high frequencies and harmonics of the current, as well as the magnetic field generated by the source resonator may present challenges in using the above-noted methods. In some implementations, as will be discussed in greater detail below, a Rogowski coil may be used as part of a current sensor for wireless power transfer systems. Rogowski coils may have, e.g., high repeatability, an ability to reject influence from the magnetic field of the source resonator, and an ability to determine root-mean-square (RMS) current from a voltage level output. The measured coil (as well as the Rogowski coil) may be a conductor/conductive material or trace, such as copper, copper-clad steel, Litz, and the like, and the measured coil may be driven with a power source (e.g., an AC source).

In some implementations, as will be shown in greater detail below, a (differential) current value of a conductor may be measured by routing the conductor through the inner diameter D2 of the coil of conductive material. The conductor may be part of a resonator coil. For example, a current value of the resonator may be used, for example, for setting the magnetic field level in order to transfer power wirelessly, and as such, it may be useful to know its value. In some implementations, the current measurement may be measured on a source resonator as a confirmation of the current levels and may be used as a feedback to control circuitry. For example, control circuitry may turn up or turn down power supplied to the source resonator in response to a feedback signal from the current sensor. In some implementations, the magnitude/amplitude value and phase value relationships of the (e.g., AC) current measurements may be used to measure impedance changes with the example disclosed current sensing system(s). Other uses for the current measurement may be used as well.

Rogowski coils as current sensors may be used for low frequency applications, such as 50-60 Hz for, e.g., power grid applications. Similarly, the above-noted methods of measuring current may fail when applied to signals greater than 1 MHz. They may also fail when placed in a magnetically noisy environment, such as those provided in (highly resonant) wireless energy transfer systems. Thus, in some implementations, the example current sensor may allow for, e.g., measuring the high frequency current while rejecting magnetic interference on the sensor, may be easily repeatable from a manufacturing standpoint and have the capability of withstanding tolerances in manufacturing, and may include a parallel resonant filter or balanced filter to remove harmonic content and/or common-mode voltage in the measured signal. As will be discussed in greater detail below, in some implementations, the current sensor with the filter as a current sensor may be produced on a printed circuit board (PCB), e.g., for a wireless energy transfer system, and (1) may reject magnetic field effects from the wireless energy transfer source resonator, (2) may be unaffected by DC offset in measured current, (3) may include the ability to measure high frequency currents, (4) may not have the problem of core saturation due to the lack of a magnetic material core, (5) may enable harmonics to be attenuated in the current signal due to the filter, (6) may not present a noticeable impedance shift or insertion loss on the source resonator, (7) may be highly repeatable from a manufacturing standpoint, (8) may be a small and low cost design since many of the components, such as the Rogowski coil itself, may be made via traces in the layers of the PCB, (9) may not result in significant change in the capabilities of the sensor due to mechanical variation, and (10) may enable an output that is a scaled voltage and easily measured.

As discussed above, and referring also at least to FIGS. 21-26, a current sensing system for wireless energy transfer may include a printed circuit board (PCB), wherein the printed circuit board may include at least a first layer, a second layer, and a third layer. A loop of conductive material may be included, wherein the loop of conductive material may include a diameter D3 on the second layer. A coil of conductive material may be included, wherein the coil of conductive material may have at least 2 turns, wherein the coil of conductive material (e.g., a majority of the coil of conductive material) may occupy the first layer and the third layer with an outer diameter D1 and an inner diameter D2, connected through each of the first, second, and third layers. The loop of conductive material may be coupled to the coil of conductive material.

Figure 21:
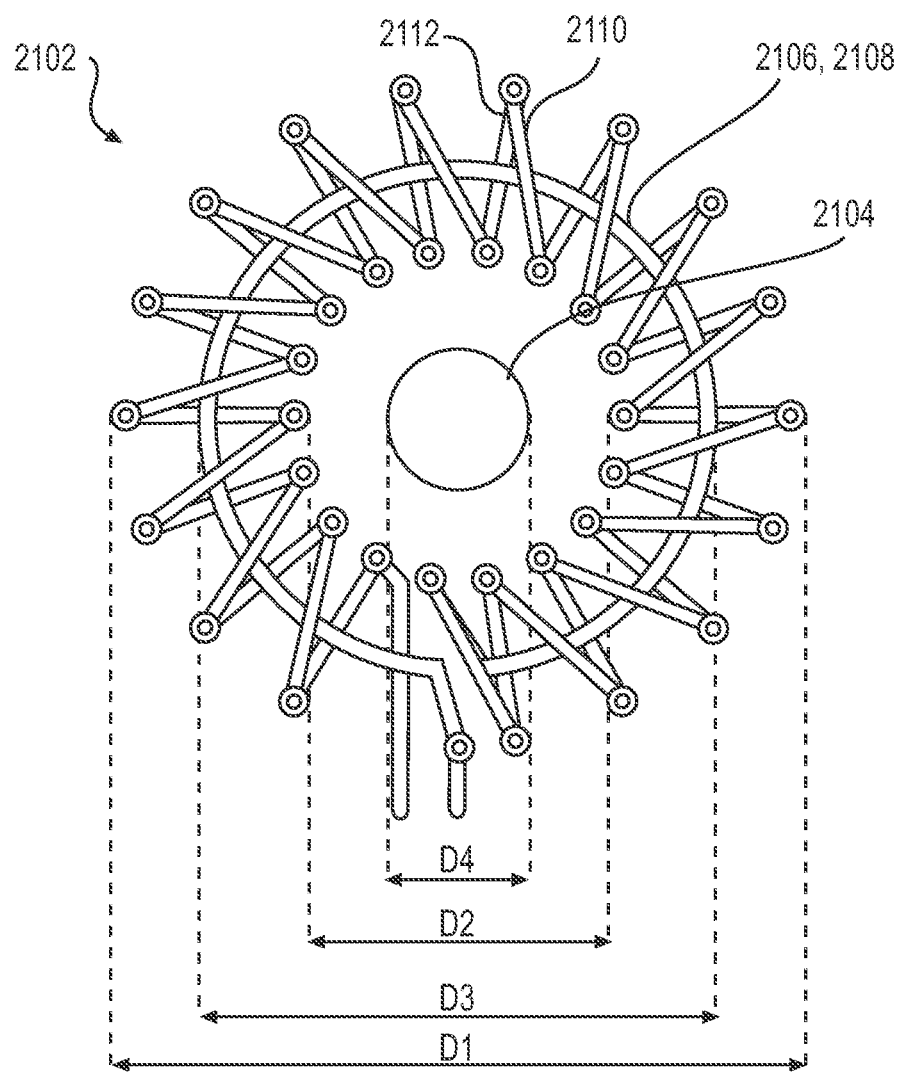
FIG. 21 is an example diagrammatic view of a current sensor for a wireless energy transfer system according to one or more example implementations of the disclosure.
Figure 22:
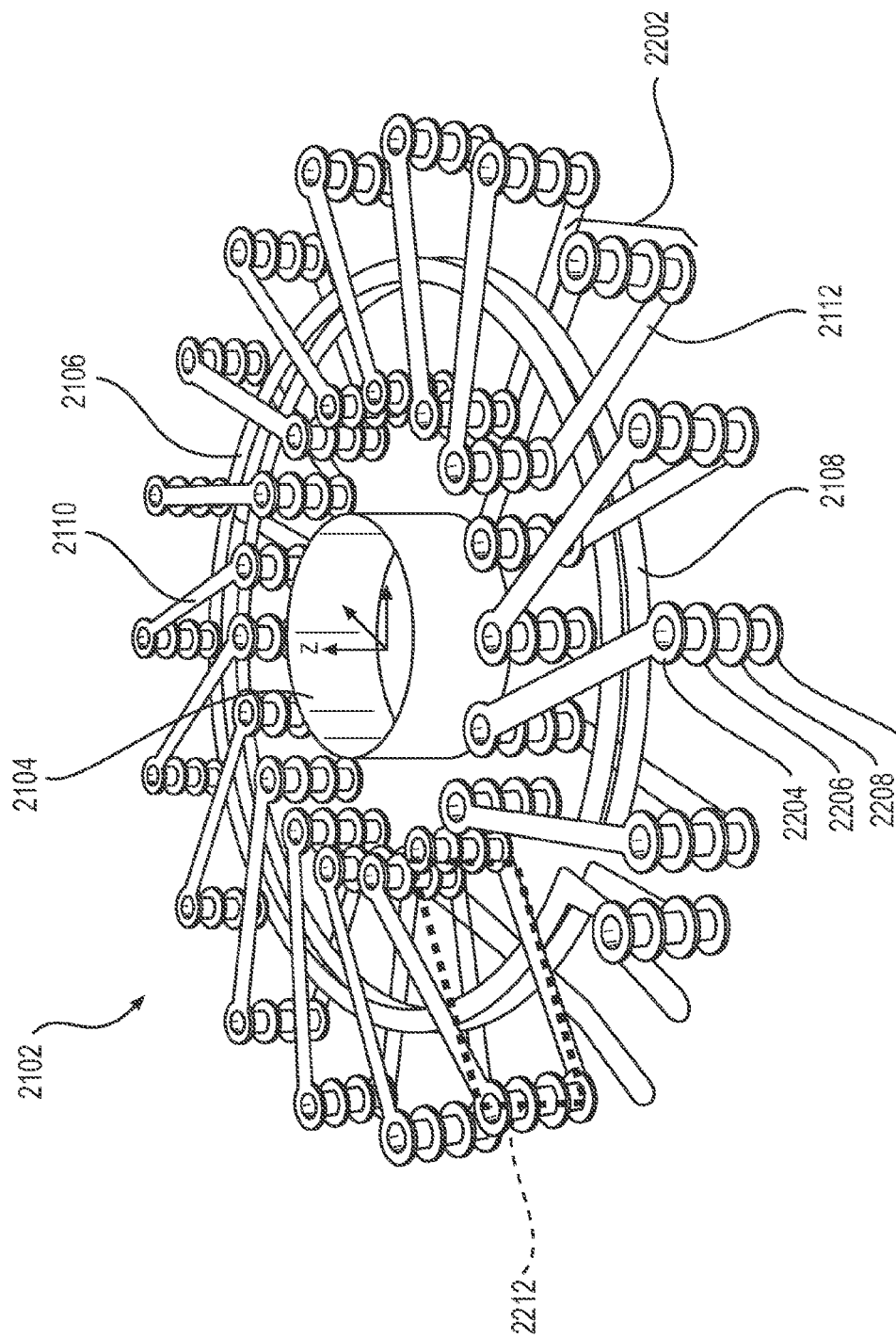
FIG. 22 is an example diagrammatic view of a current sensor for a wireless energy transfer system according to one or more example implementations of the disclosure.

For example, and referring at least to FIGS. 21-22, a coil of the current sensor (e.g., current sensor coil 2102) may be designed to maximize the number of turns in the area, as well as maximize of the area of the coil itself. In the non-limiting example, current sensor coil 2102 may have, e.g., 17 turns, with an outer diameter D1 of, e.g., 400 mm and an inner diameter D2 of, e.g., 200 mm. In some implementations, a loop of conductive material may be included, wherein the loop of conductive material may include a diameter D3 on the second layer. For example, current sensor coil 2102 may include a loop of conductive material (e.g., one or more internal coils 2106 and 2108). The inner diameter D2 may be greater than the space available for the measured conductor, for example, the diameter D4 of hole 2104. In some implementations, the "footprint" or outer area may be kept small in order to be a practical sized sensor on a small-sized PCB. In some implementations, the sensor may be sized such that it may be created on the same PCB as the conductor being measured (e.g., the source resonator coil). In some implementations, the loop of conductive material and the coil of conductive material may form a Rogowski coil. For example, the Rogowski coil may be formed by the loop of conductive material and the coil of conductive material, where the loop may be connected to the coil at an end-point via (not shown in FIG. 22). In the example, the Rogowski coil may occupy all layers of the PCB.

In some implementations, current sensor coil 2102 may be designed to mainly occupy the top 2204 and bottom 2210 layers of a PCB as well as two inner layers 2206 and 2208, which may enable the closing of current sensor coil 2102 in around itself. In some implementations, a coil of conductive material may be included, such as coil windings 2110 and 2112, which may have at least 2 turns. In some implementations, the coil of conductive material may have at least 15 turns. In some implementations, a majority of coil windings 2110 and 2112 may occupy the first layer and the third layer with an outer diameter D1 and an inner diameter D2, connected through each of the first, second, and third layers of the PCB. For example, the connection may occur in the via that appears to be only connected to the coil on the bottom right hand side. The outer coil and the inner loop may be connected and may not actually complete an entire loop as they may return instead to where they started. One or more internal portions of coils 2106 and 2108 may be coupled to coil windings 2110 and 2112. In some implementations, the result of coil windings 2110 and 2112, as well as the associated vias for respective layers 2204, 2206, 2208, 2210 may effectively be toroidal in shape. Current sensor coil 2102 may be configured with at least one of a straight return and a balanced winding (e.g., for the return loop of conductive material). For example, an example of the straight return is shown in FIG. 21. As shown in example FIG. 21, the loop on the inner layer does not wind or interleave with the coil on the outer two layers, therefore showing a straight return (e.g., no interleaving or winding). It returns straight back to the starting point where the connection may be made. By contrast, a balanced winding may occur when forward and reverse paths wind around each other so that it becomes balanced, and where one path may not be shorter than the other. The balanced winding may be interwoven with the original coil. The loop and the coil may connect at an end point via in such a way that a complete "connected" loop is not made. The coil may be configured with a balanced winding return loop of conductive material, where the conductive material may occupy the first and third layer in a way that avoids interference with the coil of conductive material on the same layers. The balanced winding return loop may have outer diameter of D1 and an inner diameter of D2. In the example, the measurement may be proportional to the differential of the current (instead of being directly proportional to the current).

In some implementations, top trace of coil winding 2110 may occupy first layer 2204, the second trace of internal coil 2106 may occupy second layer 2206, the third trace of internal coil 2108 may occupy third layer 2208, and the bottom trace of coil winding 2112 may occupy fourth layer 2210. In some implementations, various other layer PCBs may be used without departing from the scope of the disclosure. For instance, a four-layer PCB may be more available for manufacture and thus chosen over a three-layer PCB. In some implementations, the fourth layer may be positioned proximate to the second and third layers, wherein the fourth layer may include an additional loop of conductive material (e.g., one or more of the internal coils 2106 and 2108) coupled to at least one of the one or more internal coils 2106 and 2108 and the coil of conductive material (e.g., coil windings 2110 and 2112), wherein the additional circular loop of conductive material may have a diameter D3 on the fourth layer.

In some implementations, second and third traces of internal coils 2106 and 2108 may occupy equal vertical space in a cross-section of a four-layer PCB or may be combined into a single trace in the case of a three-layer PCB. In some implementations, current sensor coil 2102 may occupy only three layers of the PCB, with top trace of coil winding 2110 occupying a first layer, the second trace of internal coil 2106 occupying a second layer, and the bottom trace of coil winding 2112 occupying a third layer. The approximate area 2212 covered by sensor coil 2102 may be given by taking the difference between the greater diameter D1 and the smaller diameter D2, and multiplying it by height 2202. Height 2202 is shown by example as the thickness of the PCB, but the dielectric material has been made transparent. Height 2202 may also be described as the distance between the top and bottom layer of current sensor coil 2102 if current sensor coil 2102 does not occupy the entire PCB stack-up. On the other hand, if it does occupy the entire stack-up, then height 2202 may be equivalent to the thickness of the PCB.

Figure 24:
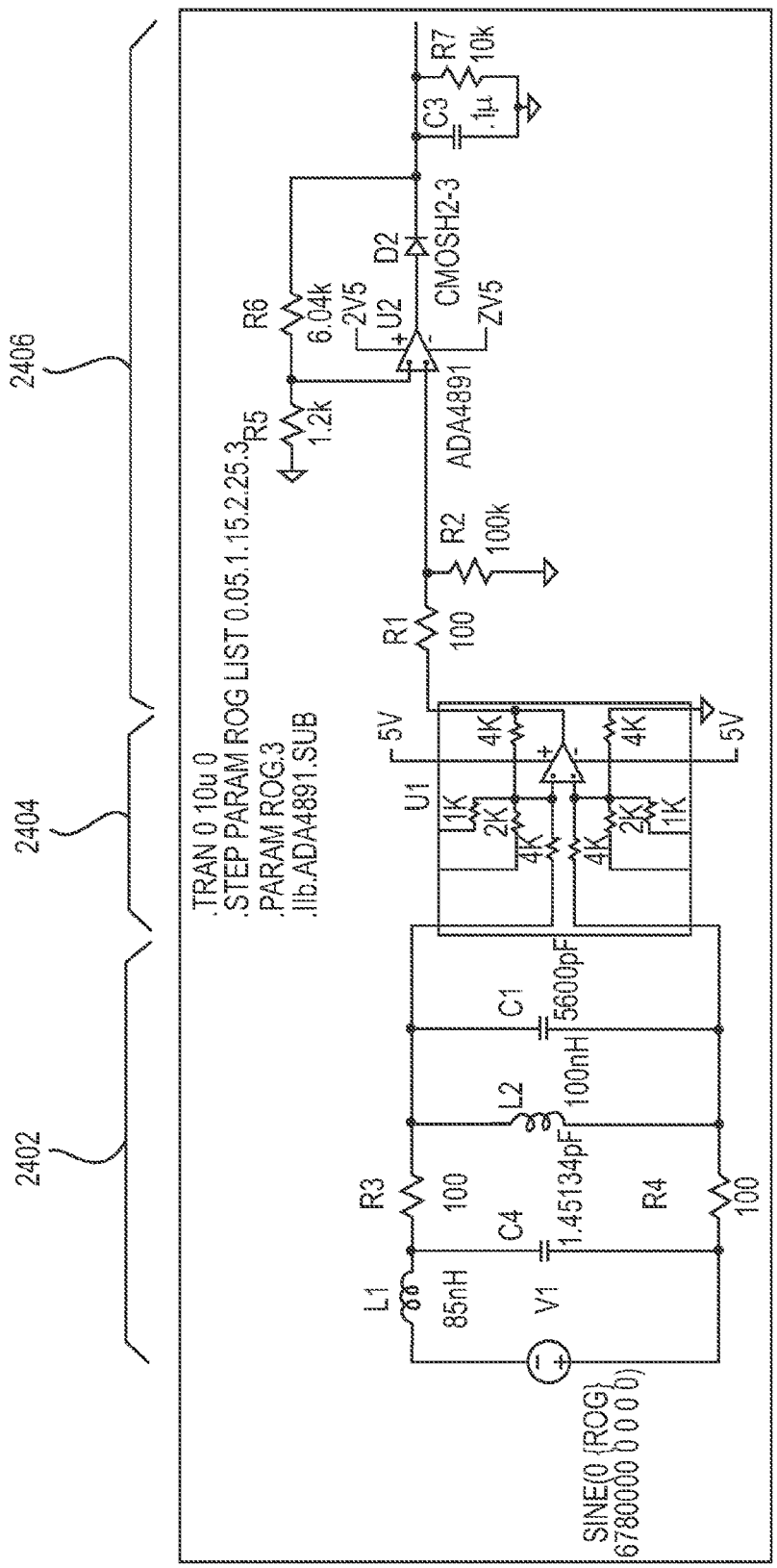
FIG. 24 is an example schematic diagrammatic view for a current sensor for a wireless energy source according to one or more example implementations of the disclosure.

In some implementations, current sensor coil 2102 may be able measure currents with frequencies within the approximate range of, e.g., 85 kHz to 20 MHz. In some implementations, e.g., for lower frequencies, current sensor coil 2102 may be designed to have more turns and more area 2212 to achieve a measurable output voltage. In some implementations, area 2212 may be the loop area of the initial coil winding that wraps around the internal straight return. The loop area may be dictated by, e.g., the thickness of the PCB (e.g., height 2202) and the inner and outer diameters (D1 and D2). In some implementations, the upper range of frequencies current sensor coil 2102 may measure may be determined by the self-resonant frequency of the current sensor (as shown in FIG. 24 and represented by L1 and C4 as modeling the (Rogowski) sensor self-resonant frequency). In some implementations, a current carrier on a PCB may be measured using this type of current sensor by, e.g., increasing the number layers of the PCB. For example, in a six-layer PCB, the current carrier may occupy the first and last layer by travelling vertically through all six-layers, while the current sensor may occupy the center four-layers of the six-layer PCB and wind around the current carrier.

Figure 23:
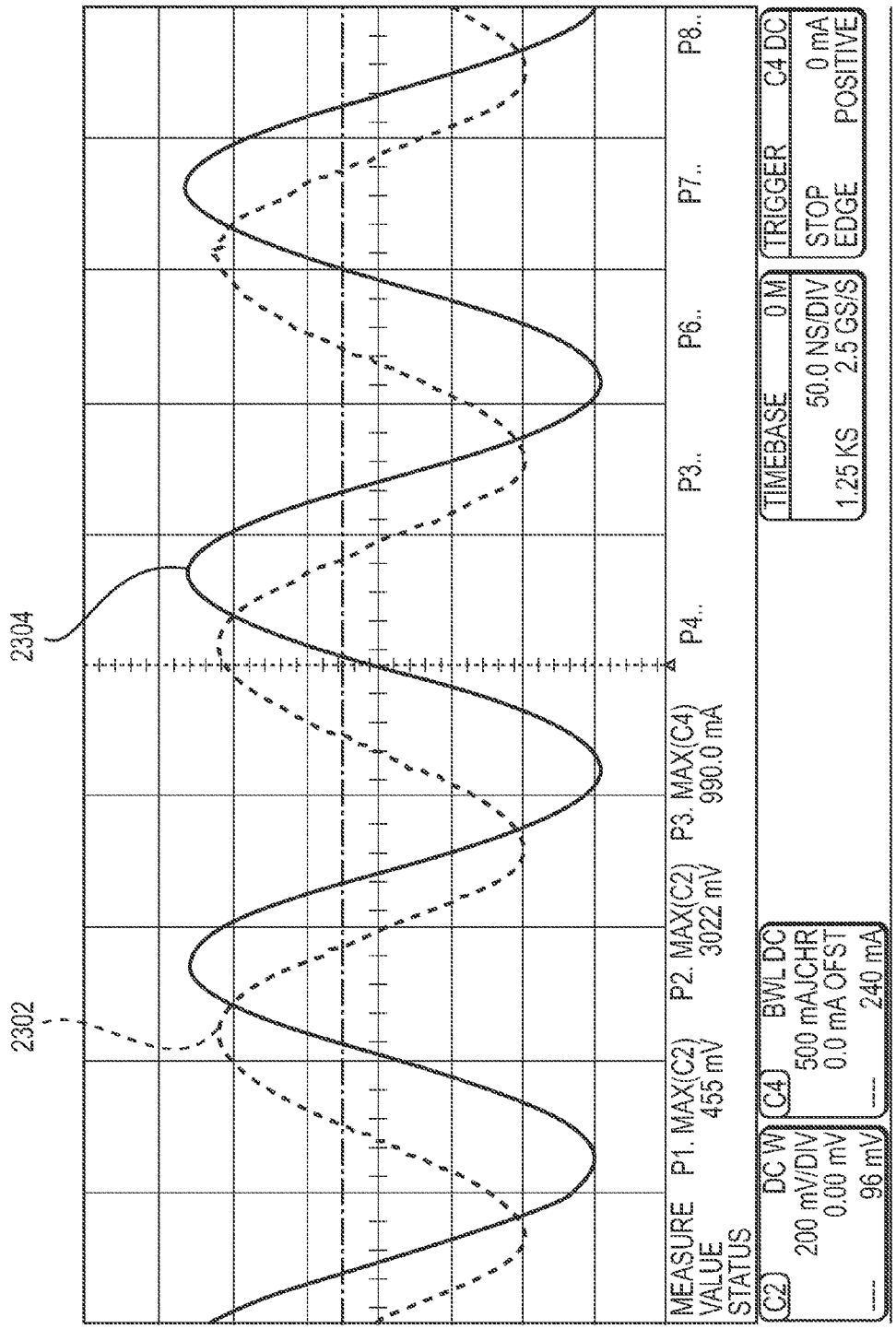
FIG. 23 is an example graph of output measurements of an example current sensor for a wireless energy transfer system according to one or more example implementations of the disclosure.

In some implementations, and referring at least to FIG. 23, example empirical measurements for the measured coil current output is shown. In the non-limiting example, waveform 2304 may be the coil current measured and waveform 2302 may be the output voltage of current sensor coil 2102. In the example measurement, the RMS value of the coil current is 998.8 mA and the RMS value of the output voltage of current sensor coil 2102 is 302.2 mV. These values may be used (e.g., correlated for best accuracy or relative if not) in order to regulate the magnetic field level. Regulating the current based on receiving devices may also allow wider variations in coupling to have smaller ranges of voltage, since the voltage output levels may be proportional to the current levels (and hence magnetic field levels). This is one example. Other example uses may be to ensure safe magnetic field levels, detect impedance changes or other changes that may change the coil current, etc. Using the coil current phases and magnitudes of the multiple currents in its associated matching network may also be used to detect impedance at the coil.

In some implementations, a wire (which may be connected to a node in a resonant tank or to one of the nodes of a resonator coil) may pass through a hole in the center of current sensor coil 2102 embedded in the PCB. In some implementations, a parallel resonant circuit may be included and may remove harmonic content. For example, current sensor coil 2102 may be tuned with a resonant filter specifically targeted to minimize the harmonics in the measurement, and the output of the sensor coil may be connected to measurement circuitry. In some implementations, a balanced filter circuit may be included and may remove harmonic content and/or common-mode voltage. In some implementations, the measurement circuitry may filter and scale the signal in order to be more easily read by a microprocessor, which may access the measurement of current sensor coil 2102.

For example, and referring at least to FIG. 24, an example schematic of a current sensor, as well as the circuits that may be used to interface with the current sensor, is shown. In the example, the current sensor 2402 may be modeled by an inductance L1 and a capacitance C4 that may be intrinsic to the sensor coil. R3, R4, L2 and C1 may be discrete circuit components; L2 and C1 may be a resonant circuit that may have the same resonant frequency of the measured current. In the example, current sensor 2402 may be passive and the voltage source V1 may be a model of the magnetic field that the current sensor sits in. In some implementations, a differential amplifier with a voltage output may be included. For instance, an integrating amplifier with differential input and a single-ended voltage output may be included. For example, current sensor 2402 may be connected to a differential amplifier 2404 that may have a single voltage output. Components R1 and R2 may be designed to load differential amplifier 2404. In some implementations, peak detector circuitry may be included and may include an operational amplifier to track a peak of the voltage output and determine a measured (differential) current value of a conductor. For example, circuitry 2406 may include an operational amplifier that may be used as a peak detector, which may track the peak of the output voltage and may determine the measured coil current.

In some implementations, and referring at least to FIGS. 21 through 26, another example schematic of a current sensor, as well as the circuits that may be used to interface with the current sensor, are shown. In the example, the size range may include, e.g., D1=0.375 to 0.8 inches, D2=0.19 to 0.4 inches, with D3 centered in the middle of D1 and D2, and where D4 may be dependent on desired wire gauge and may be irrelevant to operation. In some implementations, the number of turns of the coil may range from approximately 16 to 36. However, it will be appreciated that this may be a small subset of what may be built. These variables may be dependent on desired frequency range, current range, etc.

Figure 25:
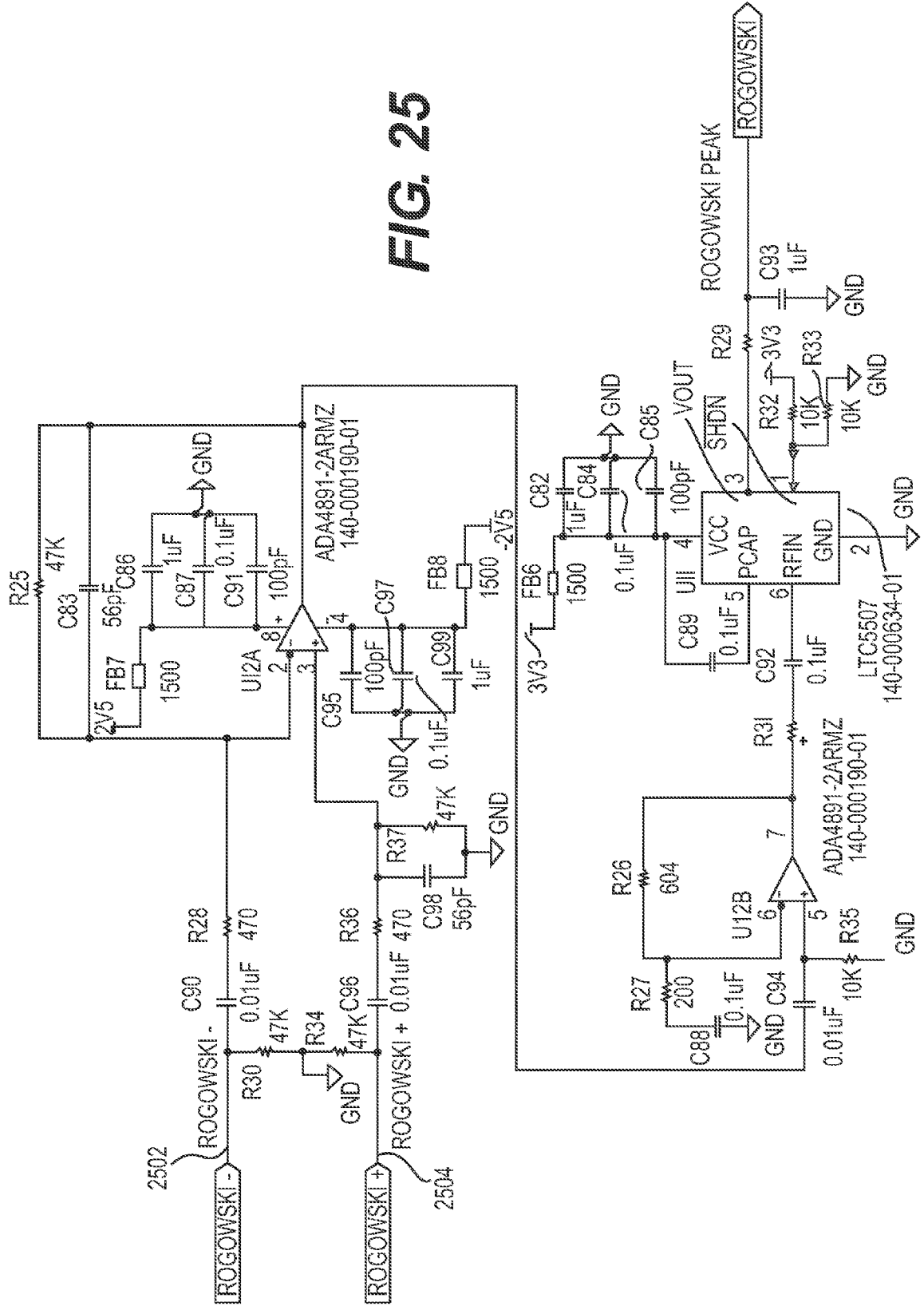
FIG. 25 is an example schematic diagrammatic view for a current sensor for a wireless energy source according to one or more example implementations of the disclosure.

The associated circuitry in FIG. 25 may be configured as a balanced differential amplifier, that may be configured with integration, may be followed by a secondary gain stage (if necessary), and may be terminated by an RF power measurement chip that may output a voltage relative to the peak input voltage. As seen in the example, the two terminals on the left (2502 and 2504) may come directly from a current sensor coil, and the terminal on the right may terminate at the microprocessor.

Figure 26:
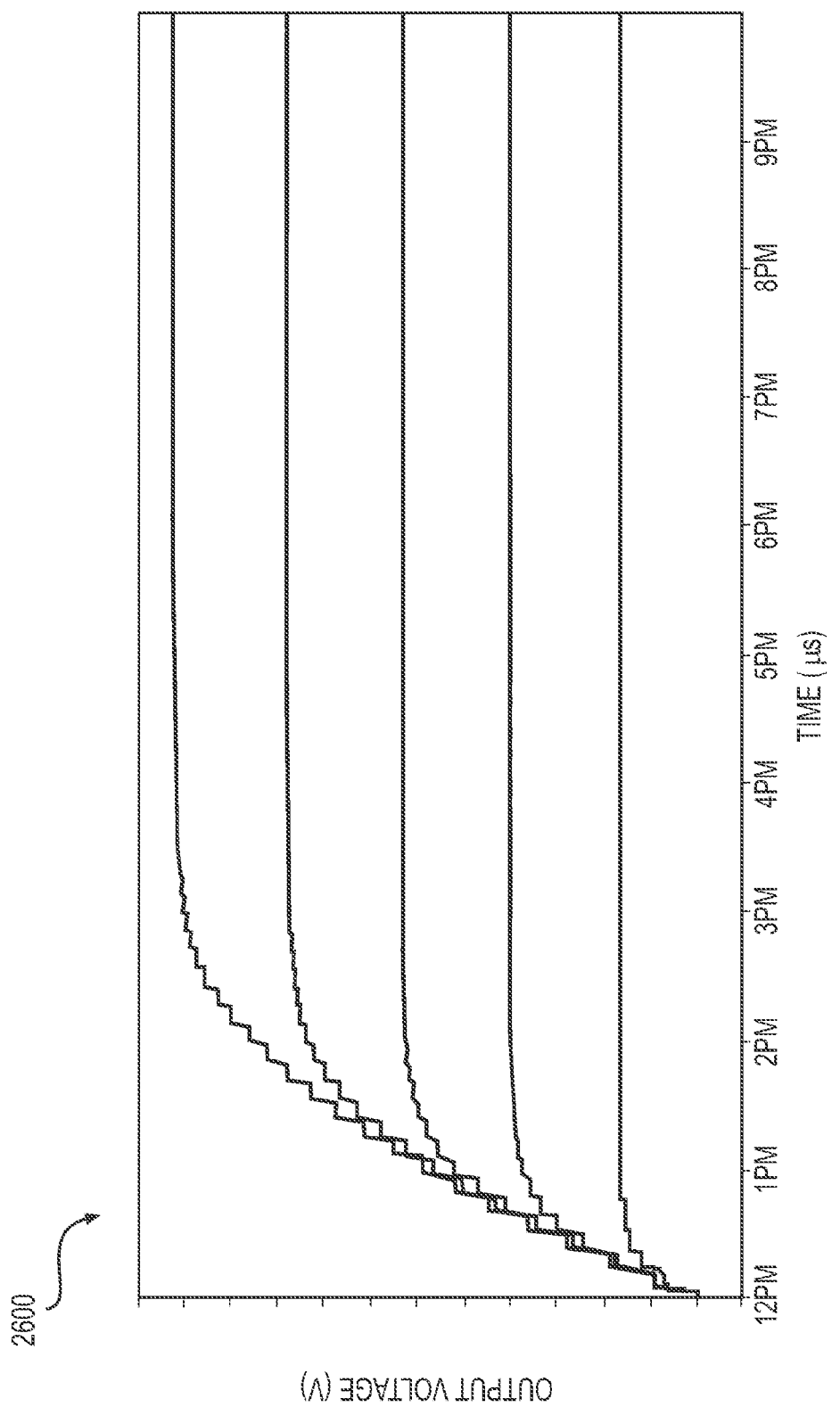
FIG. 26 is an example graph of output measurements of an example current sensor for a wireless energy transfer system according to one or more example implementations of the disclosure.

In some implementations, and referring at least to FIGS. 24 and 26, example empirical results 2600 of a current sensor coil is shown. The measurements shown may be taken at the output of the peak detector circuitry (e.g., circuitry 2406) at different measured AC current levels.

In some implementations, a relationship may be established to predict the output voltage of a given design of the current sensor coil. For example, the relationship may be given by:

$$V\text{out}=-C^*u_0^*u_r^*N^*A^*(di/dt),$$

where C is a constant accounting for the PCB, $u_0^*u_r$ is the permeability of the material between the current sensor coil and the current carrier being measured, N is the turn density (e.g., turns per meter) of the current sensor coil, A is the cross-sectional area of the current sensor coil (given by 2212 in FIG. 22), and (di/dt) is the rate of change of the current being measured. In some implementations, e.g., where the current is a sine wave, the rate of change may be a sine wave. For other types of waves, such as square waves, integration electronics may be required.

In some implementations, the measured current may be found from the output voltage by first empirically measuring current levels of the conductor and corresponding output voltages of the current sensor, and creating a reference table.

While the above disclosure may use examples of mobile electronic devices, it will be appreciated that any type of electronic device may be used without departing from the scope of the disclosure. As such, any examples of using mobile electronic devices should be taken as example only and not to otherwise limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A wireless power source comprising:
   a printed circuit board, wherein the printed circuit board includes at least a first layer, a second layer, and a third layer;
   a current sensor created on the printed circuit board, the current sensor comprising
      a loop of conductive material, wherein the loop of conductive material includes a diameter D3 on the second layer, and
      a coil of conductive material, wherein the coil of conductive material has at least two turns, wherein the coil of conductive material occupies the first layer and the third layer with an outer diameter D1 and an inner diameter D2, connected through each of the first, second, and third layers, such that the at least two turns of the coil of conductive material wrap around the loop of conductive material, and wherein the loop of conductive material is coupled to the coil of conductive material;
   a conductor routed through the inner diameter D2 of the coil of conductive material; and
   circuitry coupled with the current sensor, the circuitry being configured to use the current sensor to measure one or more values of current flowing through the conductor;
   wherein the circuitry comprises circuitry configured to remove harmonic content from a signal received from the current sensor, a differential amplifier with a voltage output, and peak detector circuitry including an operational amplifier to track a peak of the voltage output and determine a measured current value of the conductor.

2. The wireless power source of claim 1, comprising a resonator coil comprising the conductor.

3. The wireless power source of claim 1, wherein the printed circuit board comprises a fourth layer proximate to the second and third layers, wherein the current sensor comprises an additional loop of conductive material occupying the fourth layer, the additional loop of conductive material being coupled to at least one of the loop of conductive material and the coil of conductive material, wherein the additional loop of conductive material has a diameter D3 on the fourth layer, and wherein the at least two turns of the coil of conductive material wrap around the additional loop of conductive material.

4. The wireless power source of claim 1, wherein the coil of conductive material is configured with at least one of a straight return and a balanced winding.

5. The wireless power source of claim 1, wherein the circuitry is configured to measure currents with frequencies within a range of 85 kHz to 20 MHz using the current sensor.

6. The wireless power source of claim 1, wherein the coil of conductive material has at least 15 turns.

7. A wireless power source comprising:
   a printed circuit board comprising three or more layers, including a first layer, a second layer, and a third layer;
   a Rogowski coil that occupies each of the first layer, the second layer, and the third layer of the printed circuit board, wherein the Rogowski coil comprises at least one conductive trace on or within each of the first layer, the second layer, and the third layer of the printed circuit board;
   a source resonator coil that occupies at least one of the three or more layers of the printed circuit board, wherein the source resonator coil comprises or is electrically coupled with a conductor routed through the Rogowski coil; and
   circuitry coupled with the Rogowski coil, the circuitry being configured to use the Rogowski coil to measure one or more values corresponding to current flowing through the conductor routed through the Rogowski coil.

8. The wireless power source of claim 7, wherein the circuitry comprises circuitry configured to remove harmonic content from a signal received from the Rogowski coil.

9. The wireless power source of claim 8, wherein the circuitry comprises a differential amplifier with a voltage output.

10. The wireless power source of claim 9, wherein the circuitry comprises peak detector circuitry including an operational amplifier to track a peak of the voltage output and determine a measured current value of the conductor.

11. The wireless power source of claim 10, wherein the circuitry is configured to measure currents with frequencies within a range of 85 kHz to 20 MHz using the Rogowski coil.

12. The wireless power source of claim 7, wherein the Rogowski coil comprises:
    multiple conductive traces on each of the first layer and the third layer; and
    vias that pass through the second layer and electrically couple the multiple conductive traces of the first layer with the multiple conductive traces of the third layer;
    wherein the multiple conductive traces and the vias are, together, effectively toroidal in shape, and the effectively toroidal shape of the multiple conductive traces and the vias wrap around the at least one conductive trace on or within the second layer.

13. The wireless power source of claim 12, wherein the Rogowski coil comprises a straight return comprising the at least one conductive trace on or within the second layer.

14. The wireless power source of claim 12, wherein the printed circuit board comprises a fourth layer between the second layer and the third layer, the vias also pass through the fourth layer, the Rogowski coil comprises at least one conductive trace on or within the fourth layer, and the effectively toroidal shape of the multiple conductive traces and the vias wrap around the at least one conductive trace on or within the fourth layer.

15. The wireless power source of claim 12, wherein the Rogowski coil comprises a balanced winding.

16. The wireless power source of claim 7, wherein the Rogowski coil has at least fifteen turns.

17. A current sensor for wireless power transfer systems, the current sensor comprising:
  a printed circuit board comprising a first layer, a second layer, a third layer, and a fourth layer; and
  a Rogowski coil that occupies each of the first layer, the second layer, the third layer, and the fourth layer of the printed circuit board;
  wherein the Rogowski coil comprises
    multiple conductive traces on each of the first layer and the fourth layer of the printed circuit board,
    vias that pass through the second layer and the third layer and electrically couple the multiple conductive traces of the first layer with the multiple conductive traces of the fourth layer, and
    at least one conductive trace on or within each of the second layer and the third layer of the printed circuit board,
  wherein the multiple conductive traces and the vias are, together, effectively toroidal in shape, and the effectively toroidal shape of the multiple conductive traces and the vias wrap around both the at least one conductive trace on or within the second layer and the at least one conductive trace on or within the third layer.

18. The current sensor for wireless power transfer systems of claim 17, wherein the printed circuit board comprises six layers, which include a center four layers being the first layer, the second layer, the third layer, and the fourth layer, and the current sensor comprises:
  a current carrier that occupies all of the six layers and passes vertically through the center four layers of the six layers of the printed circuit board;
  wherein the Rogowski coil occupies the center four layers of the six layers of the printed circuit board, and the Rogowski coil winds around the current carrier.

19. The current sensor for wireless power transfer systems of claim 17, wherein the conductive traces on or within the first layer, the second layer, the third layer, and the fourth layer of the printed circuit board are copper traces.

20. The current sensor for wireless power transfer systems of claim 17, wherein the Rogowski coil has at least fifteen turns.

21. The current sensor for wireless power transfer systems of claim 20, wherein the Rogowski coil has seventeen turns, an inner diameter of 200 millimeters, and an outer diameter of 400 millimeters.

* * * * *

UNITED STATES PATENT AND TRADEMARK OFFICE
CERTIFICATE OF CORRECTION

PATENT NO. : 9,917,479 B2
APPLICATION NO. : 14/688286
DATED : March 13, 2018
INVENTOR(S) : Daniel Bronson, Bryan T. Sharp and Kylee D. Sealy Page 1 of 1

It is certified that error appears in the above-identified patent and that said Letters Patent is hereby corrected as shown below:

In the Claims

Column 26, Line 43, in Claim 10, delete "amplifler" and insert -- amplifier -- therefor.

Signed and Sealed this
First Day of May, 2018

Andrei Iancu
*Director of the United States Patent and Trademark Office*